(12) United States Patent
Carney, Jr.

(10) Patent No.: US 6,260,649 B1
(45) Date of Patent: Jul. 17, 2001

(54) ENERGY CONSERVING ELECTRIC VEHICLE

(76) Inventor: Robert S. Carney, Jr., 4232 Colfax Ave. South, Minneapolis, MN (US) 55409

( * ) Notice: Subject to any disclaimer, the term of this patent is extended or adjusted under 35 U.S.C. 154(b) by 0 days.

(21) Appl. No.: 09/280,607

(22) Filed: Mar. 29, 1999

(51) Int. Cl.[7] .................................................. B62D 61/02
(52) U.S. Cl. ........................ 180/220; 180/65.6; 180/230
(58) Field of Search .................... 180/165, 65.1, 180/65.2, 65.3, 65.4, 65.5, 65.6, 65.7, 65.8, 221, 220, 230; 318/149, 93, 95

(56) References Cited

U.S. PATENT DOCUMENTS

| 1,291,233 | * | 1/1919 | Storer ...................................... 318/93 |
| 1,352,427 | * | 9/1920 | Candee .................................... 318/93 |
| 3,786,206 | * | 1/1974 | Kurminsky . |
| 3,841,428 | * | 10/1974 | Bialek .............................. 180/220 X |
| 3,917,017 | * | 11/1975 | Deane .................................. 180/65.1 |
| 3,921,741 | * | 11/1975 | Garfinkle et al. ................. 180/221 X |
| 3,921,745 | * | 11/1975 | McCulloch et al. .................. 180/221 |
| 3,923,116 | * | 12/1975 | Thompson et al. ................. 180/65.1 |
| 4,152,633 | * | 5/1979 | Ortenheim . |
| 4,637,274 | * | 1/1987 | Goldenfeld ...................... 180/65.2 X |
| 5,078,227 | * | 1/1992 | Becker .................................. 180/221 |
| 5,238,083 | * | 8/1993 | Horie et al. ..................... 180/65.1 X |
| 5,316,101 | * | 5/1994 | Gannon ................................. 180/221 |
| 5,671,821 | * | 9/1997 | McGreen ............................. 180/220 |
| 5,710,504 | * | 1/1998 | Pascual et al. . |
| 5,960,898 | * | 10/1999 | Okada et al. ....................... 180/65.8 |

FOREIGN PATENT DOCUMENTS

405310176 * 11/1993 (JP) .

* cited by examiner

Primary Examiner—Brian L. Johnson
Assistant Examiner—Bryan Fischmann
(74) Attorney, Agent, or Firm—Dorsey & Whitney LLP

(57) ABSTRACT

A vehicle and vehicle system(s) comprising: rechargeable battery cells, switches, electric circuits, control means, a drive train, and one or more motor-generator devices, such that for each motor-generator device the motor-generator device alternatively operates both: (a) as a motor at a higher voltage to drive the vehicle, and (b) at a lower voltage as a generator, transforming the vehicle's kinetic energy into electrical energy stored in the rechargeable battery cells as the motor-generator functions as a brake to decelerate and stop the vehicle, thus conserving and reusing energy that is dissipated and lost by other vehicles.

20 Claims, 20 Drawing Sheets

Figure 20

```
SWITCH NUMBER   SWITCH POSITIONS, ONE THROUGH THIRTY-EIGHT (POSITION 17 IS NEUTRAL), 1 = ON, 0 = OFF
PER FIG. 9-14   01 02 03 04 05 06 07 08 09 10 11 12 13 14 15 16 17 18 19 20 21 22 23 24 25 26 27 28 29 30 31 32 33 34 35 36 37 38
VOLTS, POINTS
204-203:        -2 -2 -2 -2 -2 -2 -2 -2 -2 -2 -2 -2 -2 -2 -2 -2  0 12 12 12 12 12 12 12 12 12 12 12 12 12 12 12 14 16 18 20 22 24
 1               0  0  0  0  0  0  0  0  0  0  0  0  0  0  0  0  0  1  1  1  1  1  1  1  1  1  1  1  1  1  1  1  1  1  1  1  1  1
 2               0  0  0  0  0  0  0  0  0  0  0  0  0  0  0  0  0  1  1  1  1  1  1  1  1  1  1  1  1  1  1  1  1  1  1  1  1  1
 3               1  1  1  1  1  1  1  1  1  1  1  1  1  1  1  1  0  0  0  0  0  0  0  0  0  0  0  0  0  0  0  0  0  0  0  0  0  0
 4               1  1  1  1  1  1  1  1  1  1  1  1  1  1  1  1  0  0  0  0  0  0  0  0  0  0  0  0  0  0  0  0  0  0  0  0  0  0
 5               1  1  1  1  1  1  1  1  1  1  1  1  1  1  1  1  0  0  0  0  0  0  0  0  0  0  0  0  0  0  0  0  1  0  0  0  0  0
 6               0  0  0  0  0  0  0  0  0  0  0  0  0  0  0  0  0  1  1  1  1  1  1  1  1  1  1  1  1  1  1  1  0  1  1  1  1  1
 7               1  1  1  1  1  1  1  1  1  1  1  1  1  1  1  1  0  0  0  0  0  0  0  0  0  0  0  0  0  0  0  0  1  1  0  0  0  0
 8               1  1  1  1  1  1  1  1  1  1  1  1  1  1  1  1  0  0  0  0  0  0  0  0  0  0  0  0  0  0  0  0  1  0  0  0  0  0
 9               0  0  0  0  0  0  0  0  0  0  0  0  0  0  0  0  0  1  1  1  1  1  1  1  1  1  1  1  1  1  1  1  0  0  1  1  1  1
10               1  1  1  1  1  1  1  1  1  1  1  1  1  1  1  1  0  0  0  0  0  0  0  0  0  0  0  0  0  0  0  0  1  0  1  0  0  0
11               1  1  1  1  1  1  1  1  1  1  1  1  1  1  1  1  0  0  0  0  0  0  0  0  0  0  0  0  0  0  0  0  1  1  0  0  0  0
12               0  0  0  0  0  0  0  0  0  0  0  0  0  0  0  0  0  1  1  1  1  1  1  1  1  1  1  1  1  1  1  1  0  1  0  1  1  1
13               1  1  1  1  1  1  1  1  1  1  1  1  1  1  1  1  0  0  0  0  0  0  0  0  0  0  0  0  0  0  0  0  1  1  0  1  0  0
14               1  1  1  1  1  1  1  1  1  1  1  1  1  1  1  1  0  0  0  0  0  0  0  0  0  0  0  0  0  0  0  0  1  0  1  0  0  0
15               0  0  0  0  0  0  0  0  0  0  0  0  0  0  0  0  0  1  1  1  1  1  1  1  1  1  1  1  1  1  1  1  0  0  1  0  1  1
16               1  1  1  1  1  1  1  1  1  1  1  1  1  1  1  1  0  0  0  0  0  0  0  0  0  0  0  0  0  0  0  0  1  0  0  0  1  0
17               1  1  1  1  1  1  1  1  1  1  1  1  1  1  1  1  0  0  0  0  0  0  0  0  0  0  0  0  0  0  0  0  1  1  0  0  0  0
18               0  0  0  0  0  0  0  0  0  0  0  0  0  0  0  0  0  1  1  1  1  1  1  1  1  1  1  1  1  1  1  1  0  1  1  0  0  1
19               1  1  1  1  1  1  1  1  1  1  1  1  1  1  1  1  0  0  0  0  0  0  0  0  0  0  0  0  0  0  0  0  1  0  0  0  0  0
20
21-25 NOT USED
26               1  1  1  1  1  1  1  1  1  1  1  1  1  1  1  1  0  1  1  1  1  1  1  1  1  1  1  1  1  1  1  1  0  0  0  0  0  0
27               0  0  0  0  0  0  0  0  0  0  0  0  0  0  0  0  0  1  1  1  1  1  1  1  1  1  1  1  1  1  1  1  0  0  0  0  0  0
NOTE: 27 NOT IN FIG. 9-14
51-56 NOT USED
57               0  0  0  0  0  0  0  0  0  0  0  0  0  0  0  0  0  0  0  0  0  0  0  0  0  0  0  0  0  0  0  0  1  1  1  1  1  1
81 NOT USED
82               1  0  0  0  0  0  0  0  0  0  0  0  0  0  0  0  0  0  0  0  0  0  0  0  0  0  0  0  0  0  0  0  0  0  0  0  0  0
83               1  0  0  0  0  0  0  0  0  0  0  0  0  0  0  0  0  0  0  0  0  0  0  0  0  0  0  0  0  0  0  0  0  0  0  0  0  0
84               1  0  0  0  0  0  0  0  0  0  0  0  0  0  0  0  0  0  0  0  0  0  0  0  0  0  0  0  0  0  0  0  0  0  0  0  0  0
85-88 NOT USED
89               0  1  1  1  1  1  1  1  1  1  1  1  1  1  1  1  0  1  1  1  1  1  1  1  1  1  1  1  1  1  1  1  1  1  1  1  1  1
90               0  1  1  1  1  1  1  1  1  1  1  1  1  1  1  1  0  1  1  1  1  1  1  1  1  1  1  1  1  1  1  1  1  1  1  1  1  1
91               0  1  1  1  1  1  1  1  1  1  1  1  1  1  1  1  0  1  1  1  1  1  1  1  1  1  1  1  1  1  1  1  1  1  1  1  1  1
92 NOT USED
100 MANUAL
101              1  1  0  1  0  1  0  1  0  1  0  1  0  1  0  1  0  1  0  1  0  1  0  1  0  1  0  1  0  1  0  1  0  1  1  1  1  1
102              1  1  1  0  0  1  1  0  0  1  1  0  0  1  1  0  0  0  1  1  0  0  1  1  0  0  1  1  0  0  1  1  1  1  1  1  1  1
103              1  1  1  1  1  0  0  0  0  1  1  1  1  0  0  0  0  1  1  1  1  0  0  0  0  1  1  1  1  0  0  0  1  1  1  1  1  1
104              1  1  1  1  1  1  1  1  1  0  0  0  0  0  0  0  0  0  0  0  0  1  1  1  1  1  1  1  1  1  1  1  1  1  1  1  1  1
```

ENERGY CONSERVING ELECTRIC VEHICLE

BACKGROUND OF THE INVENTION

This invention relates to the field of electric battery powered and electric battery power assisted vehicles, and more specifically to ways to both minimize the loss of energy that results when such vehicles are stopped or slowed down by braking, and to accomplish this with a minimum of mechanical parts and systems. This invention also relates to what might be termed the field of alternative personal transport vehicles, i.e. vehicles other than cars, trucks, vans, and the like. This invention also relates to vehicles that are powered simultaneously by both foot pedals and gasoline or electric motors.

A long-standing need for electric powered vehicles and other alternative personal human transport vehicles has been widely recognized due to the tragedies, problems and difficulties associated with conventional fossil fuel powered vehicles. Upwards of forty thousand Americans are killed each year in traffic accidents, and many more people are injured. Pollution from cars is both an immediate problem in areas of heavy traffic and parking garages, and a regional and global environmental problem due to the regional and global effects of both air pollution and thermal pollution. The transportation system built around conventional gasoline powered cars has additional problems including the high cost of building and maintaining roads and parking facilities, and both personal stress and wasted energy resulting from traffic jams.

The emerging field of electric vehicles may solve or reduce many of these problems. These new vehicles will change the way people think about personal transportation. Many of them are likely to be considerably smaller and lighter then even current compact and subcompact cars. The ability to reduce power and battery capacity requirements to a minimum will be crucial to achieving the full benefit from what may be a shift in coming decades to electric vehicles as the primary personal transportation vehicle.

Conventional cars are stopped by brakes, and these brakes dissipate the vehicle's kinetic energy. Some efforts have been made to reduce or eliminate this dissipation. A German bus uses a flywheel/brake combination, where the application of the brake system drives a flywheel and transforms the linear kinetic energy of the vehicle into rotational kinetic energy that is subsequently used to accelerate the bus. Such a system is both bulky and requires many mechanical parts and for these reasons may not be best suited for small electric vehicles. U.S. Pat. No. 5,680,908 is for an electric powered vehicle that includes the use of a generator, and that specifies the generator is used to recharge batteries when the vehicle is decelerating. However, this invention uses separate devices for motors and generators, and requires the use of a transmission system to increase generator rotation to a speed sufficient to generate electricity. In addition, although the generator is specified to operate when the vehicle is decelerating, no mention is made of the function of the generator as a brake, or of the recovery of kinetic energy that would otherwise be dissipated.

SUMMARY OF THE INVENTION

The nub of the present invention is the use of a system of rechargeable battery cells, switches, electric circuits, and motor-generators, to both power a vehicle at a higher voltage level, and to conserve energy by recharging the batteries at a lower voltage level when the vehicle is being stopped or slowed. A motor-generator is a single device that functions in two modes: a) motor mode, and b) generator mode, such that the mode of function is determined by the use of different circuits and circuit elements including batteries and/or battery cells, and such that for generator mode a minimum operating RPM is required.

A vehicle of the present invention can function in four operating modes: driving mode, reverse mode, charging mode, and neutral mode. Some vehicles of the present invention, such as some pedal-electric vehicles, do not require a reverse mode.

A vehicle of the present invention uses up to nine general kinds of components.

The first kind of component of the present invention comprises what will be referred to as a Motor-Generator. Conventional commercially available DC motors can function as Motor-Generators. Motor-Generators of the present invention are operated individually and/or in combination by a driver of a vehicle of the present invention. A vehicle of the present invention will typically have Motor-Generators of different size and power, providing for a range of driving power output and generating output. A Motor-Generator component can include a clutch sub-component that is engaged when the Motor-Generator operates and disengaged when the Motor-Generator does not operate. A Motor-Generator component of the present invention functions in two modes. In both modes, the same Motor-Generator is mechanically connected to one or more wheels of a vehicle of the present invention. When operating in motor mode the Motor-Generator component is supplied DC electric power and drives the vehicle. When operating in generator mode, the same Motor-Generator component functions as a generator, and charges rechargeable battery cells of the vehicle. All Motor-Generators of a vehicle of the present invention that are operating at any time are typically functioning as either motors or as generators, with one exception. The exception is that when one or more Motor-Generators of a vehicle of the present invention are operating as motors, one or more Motor-Generators of a vehicle of the present invention may be used as generators to provide electric power to other vehicle systems, such as headlight systems, that are not comprised in the present invention, thus avoiding the waste of energy that occurs due to a battery's internal resistance when the battery is being charged and discharged.

The second kind of component of the present invention is a rechargeable battery cell. For all design versions of the present invention, multiple rechargeable battery cells are used as components. Some rechargeable battery cell components are termed charge-drive battery cells, and are used in two kinds of circuits, one circuit where multiple battery cell components are connected in parallel, and another circuit where multiple battery cell components are connected in series. In driving mode, multiple charge-drive battery cell components are connected in series to produce a relatively high voltage used to drive one or more Motor-Generators functioning as motors. In charging mode, multiple charge-drive battery cell components of the present invention are connected in parallel at a voltage as low 2V, thus allowing Motor-Generator components to charge the battery cell components while operating at a wide range of speeds including relatively low speeds. Additional battery cell components termed turbo battery cell components can also be included in series circuits with charge-drive battery cell components to provide a higher and wider range of voltage levels to operate Motor-Generator components as motors. For larger and more powerful vehicles of the present invention operating at higher voltage levels, commercially available batteries such as 4V, 6V and 12V batteries can be used as the functional equivalent of individual battery cell components.

The third kind of component is electrical wiring, including connecting points that allow multiple wires to be conveniently connected.

The fourth kind of component is an individual on-off electrical switch. Individual on-off switches can be operated independently by the driver, and/or can be operated by other components and methods to be described.

The fifth kind of component is termed a multi-switch. A multi-switch is a structure that allows a vehicle operator to simultaneously change the on-off state of multiple individual on-off electrical switches. When a multi-switch is operated, each individual on-off electrical switch controlled by the multi-switch is flipped, some from on to off and others from off to on. Mechanical toggles or levers, cables, and cable housings may be used by a driver as all or part of the means to operate a multi-switch.

An optional sixth kind of component is termed a power control switch. A power control switch opens and closes at one point all circuits to a group of Motor-Generators, such that at least one power control switch must be on for any Motor-Generator in the group to operate as a motor or as a generator.

An optional seventh kind of component is a kind of multiple circuit electrical switch termed a driver operated array switch. A driver operated array switch is comprised of: first, a set of pairs of circuit points such that each pair of points is termed an array circuit point pair, and second, of a set of three or more array switch positions. For each array switch position the driver operated array switch independently establishes the on or off status of each array circuit point pair in the set of array circuit point pairs controlled by the array switch. Mechanical toggles or levers, cables, and cable housings may be used by a driver as all or part of the means to operate an array switch. The function and importance of this kind of multiple circuit electrical switch will be presented in the detailed description.

An optional eighth kind of component is a transmission to vary the ratio of Motor-Generator RPM's to vehicle wheel RPM's.

An optional ninth kind of component is a microprocessor control device, including a microprocessor and one or more sensing devices to monitor parameters such as vehicle speed, mechanical torque, and so forth. A microprocessor control device functions to control the operation of one or more individual electrical on-off switches, either solely as a function of the monitored parameters, or as a function of both the monitored parameters and driver input into the control device, such as through one or more switches by which the driver controls or modifies the function of the control device.

The general and typical functioning of a vehicle of the present invention can be summarized as follows: First, depending on vehicle configuration, a driver may use any or all of the following to control the use and function of Motor-Generators and battery cells: power control switches, individual on-off electrical switches, multi-switches, array switches, and microprocessor control devices. All of these will be referred to collectively as control means. Second, to accelerate and maintain forward motion of the vehicle when operating in driving mode, a driver uses control means to operate one or more Motor-Generators as electrical motors, such that the Motor-Generators are drawing current from multiple battery cells operating in series. Third and optionally, for optimal Motor-Generator and vehicle performance in driving mode, the driver may use a transmission to vary the ratio of Motor-Generator RPM's to vehicle wheel RPM's. Fourth, to control vehicle speed, the driver uses control means to provide current to one or more Motor-Generators at higher or lower voltage levels, to operate as motors more or fewer Motor-Generators, and to operate as motors different individual Motor-Generators and different combinations of Motor-Generators where the individual Motor-Generators have higher and lower power outputs when operating at the same voltage. Fifth, for vehicles of the present invention that have the optional reverse mode, to operate the vehicle in reverse mode the driver uses control means to reverse the current through individual Motor-Generators to drive the vehicle backward. Sixth, to decelerate or stop the vehicle, the driver uses control means to operate one or more Motor-Generators as generators, charging one or more battery cells. Because kinetic energy of the vehicle is used to drive Motor-Generators functioning as generators, the vehicle slows down as kinetic energy is transformed into electrical potential energy in the battery cells. To control the rate of deceleration and stopping, the driver uses control means to operate more or fewer Motor-Generators as generators, to operate as generators different individual Motor-Generators and different combinations of Motor-Generators where the individual Motor-Generators have higher and lower generating output when operating at the same RPM, to connect multiple Motor-Generators in series for a higher output voltage when the Motor-Generators are operating slowly, and optionally to use a transmission to vary the ratio of Motor-Generator RPM to vehicle wheel RPM to generate more electricity at lower vehicle speeds. Thus, a vehicle of the present invention typically does not require the use of conventional brakes except in two cases: case one, to fully stop the vehicle when the vehicle is moving too slowly to generate a high enough voltage to charge battery cell components, and case two, if the vehicle must stop faster than would result from use of the highest power generating configuration available. Seventh, if the vehicle is moving downhill in drive mode and/or if and when other mechanical power is available to the vehicle, a driver may use control means to operate one or more Motor-Generators, charging one or more battery cell components. As an example, if a pedal-electric vehicle of the present invention is moving downhill, a driver may want to both pedal and operate the vehicle in charging mode, typically at a low rate of charging. This has the advantages of maintaining a constant and safe vehicle speed, providing more exercise for the driver, load-leveling a driver's total exercise while using the vehicle, and storing energy in the batteries for future use. Eighth, a driver can use control means to operate a pedal-electric vehicles of the present invention primarily or even continuously in charging mode, as a kind of non-stationary exercise bike.

Vehicles of the present invention offer several advantages, included but not limited to the following: First, vehicles of the present invention are more energy-efficient than other vehicles. Energy of motion that is wasted by other vehicles when they stop is conserved and reused by vehicles of the present invention. Second, the use of multiple voltage levels, multiple Motor-Generator components, and Motor-Generator components with higher and lower individual power and generating output, makes it possible to provide a wide range of small increments of driving power and a wide range of small increments of rates of deceleration to vehicles of the present invention without the use of any optional gearing or transmission system that varies the ratio of Motor-Generator component RPM to vehicle wheel RPM. The mechanical connection of a Motor-Generator to one or more wheels of a vehicle of the present invention can be direct, or can be via a clutch. Third, a consequence of the greater energy efficiency of a vehicle of the present invention is that in general, greater range is possible with fewer batteries and lighter vehicle weight. Fourth, features of significant potential vehicle range and light weight that derive from the present invention make it possible to develop pedal-electric vehicles that are practical substitutes to cars for many kinds of relatively short trips. Fifth, the development and use of vehicles of the present invention is not only compatible with the current infrastructure of roads and parking capacity, but also facilitates the more efficient use of the current infrastructure with lower costs for infrastructure construction and maintenance. Sixth, the development and use of vehicles of the present invention may promote the modification and improvement of the current infrastructure in ways that may reduce the number of people killed and injured in traffic accidents. Seventh, the use of pedal-electric versions of vehicles of the present invention may often be of significant benefit to a person's overall health.

BRIEF DESCRIPTION OF THE DRAWINGS

FIG. 20: Circuit Design B settings by circuit point and switch position

DETAILED DESCRIPTION OF THE INVENTION

FIGS. 1–13 pertain to a design for a pedal-electric vehicle of the present invention that has been substantially implemented in the form of a prototype vehicle that will be used for both further testing and for demonstration. Because the design and construction of a prototype vehicle has been undertaken with limited resources, it should be understood that some of the features and characteristics of the following detailed description are intended to serve as basis for claims regarding the present invention, but are not intended to explicate what might or might not come to be seen as mature design versions and variations of vehicles of the present invention. Although the detailed description of the present invention will thus follow closely along the line of a detailed description of one design embodiment, it should be understood that the present invention can be rendered in a variety of designs. Following a detailed description of the invention along the line of the design of FIGS. 1–13, the explication of FIGS. 14–20 will illustrate and detail additional elements of the present invention that are absent from the design of FIGS. 1–13. Because the present invention lends itself to a variety of vehicle designs, the invention is best characterized by reference to the claims.

Figure 1:
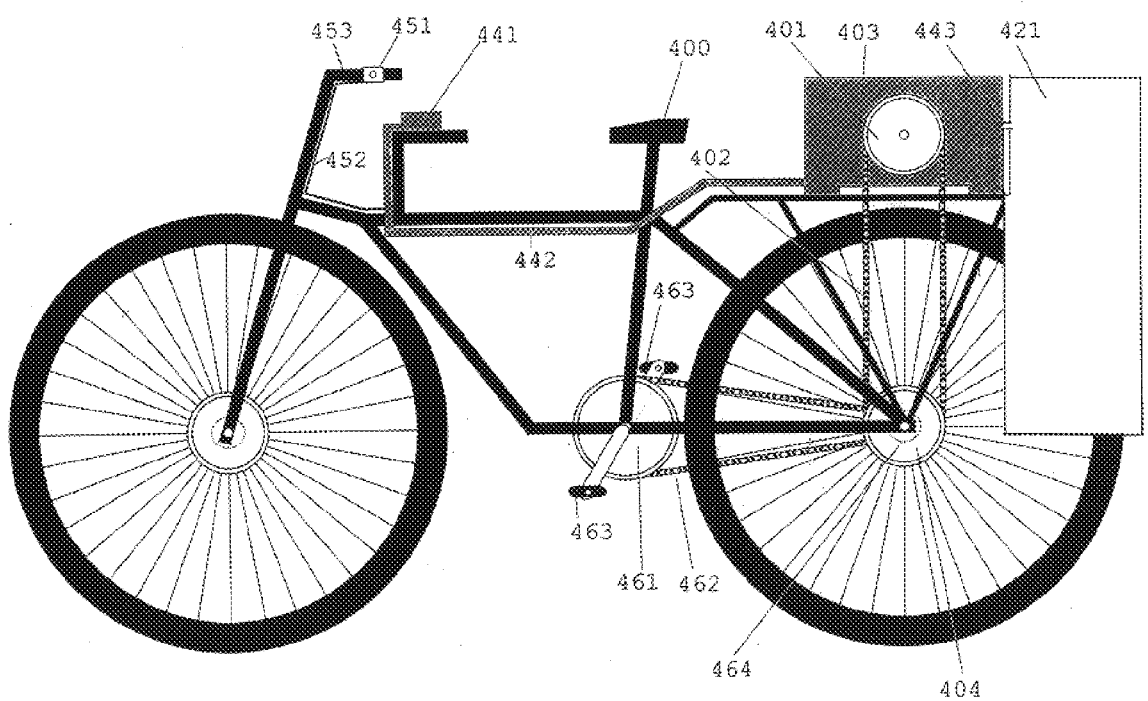
FIG. 1: Location of components of invention on a pedal-electric vehicle, side view.

FIG. 1 illustrates one possible design location for major components of the present invention for a pedal-electric vehicle. The main components of the pedal drive train system are the pedal sprocket 461, the pedals 463, the wheel sprocket 464 which is on the back side of the vehicle and is illustrated with a dotted line, and the chain 462. The pedal drive train can comprise gear shifts and multiple gears for both the pedal sprocket and the wheel sprocket, although such gear shifts and multiple gears are not illustrated in FIG. 1. Multiple Motor-Generators of the present invention are housed in the Motor-Generator housing 403 of FIG. 1. These Motor-Generators are all connected to a mechanical drive train, comprising a sprocket and drive shaft assembly 401, a chain 402, and the facing side wheel sprocket 404. The Battery and Switch housing 421 houses battery cell, battery, and switching components of the present invention. Driver operated control means are located on a driver control means panel 441, and are connected to switch components housed in Battery and Switch housing 421 via wires and cable that run through the wire and cable housing 442, the Motor-Generator housing 403, and the switch connection housing 443. Wires 452 also run from the wire and cable housing 442 to a driver operated power control switch 451 shown on the facing side of the facing handle bar 453. Depending on individual preference the driver operated control switch may be on either handle bar. The driver operated control switch is typically a push-button switch such that the switch is on when the button is held down, and the switch is off when the button is released. Thus, the switch is not on unless the driver is actively holding down the button. This is so that in the event of an accident, mishap or difficulty, the Motor-Generators will stop operating.

Figure 2:
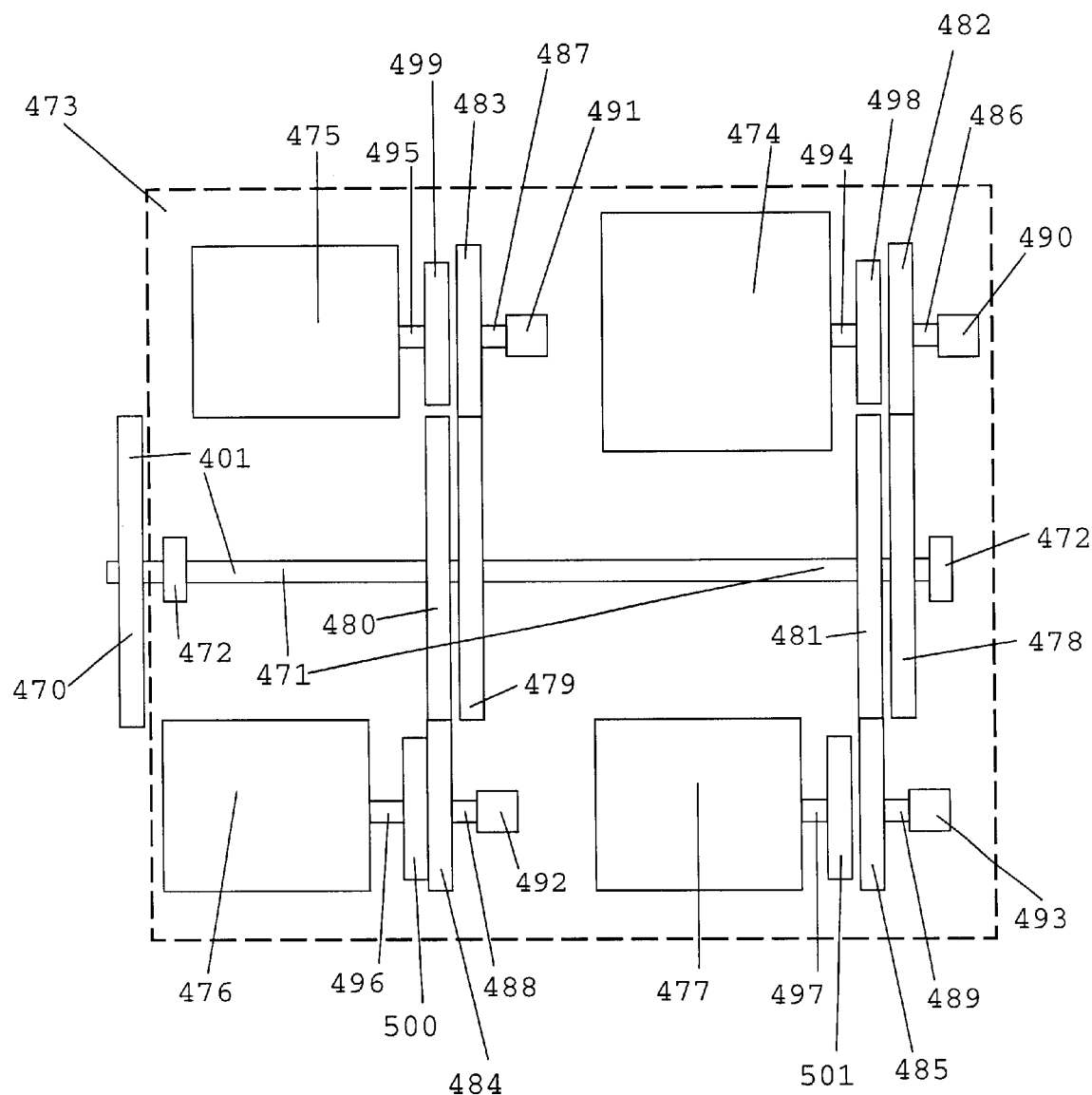
FIG. 2: Motor-Generator and related component set A for pedal-electric vehicle, top view.

FIG. 2 illustrates a basic design placement for four Motor-Generators of the present invention contained in the Motor-Generator housing 403 of FIG. 1. The sprocket and drive shaft assembly 401 includes a sprocket 470 that is center mounted and permanently attached to a central drive shaft 471. The central drive shaft 471 is mounted on two mountings 472, that are mounted to the base platform 473 of the Motor-Generator housing 403 of FIG. 1. Continuing to refer to FIG. 2, four Motor-Generators 474–477 are also mounted to the base platform 473. Four central drive gears 478–481 are center mounted and permanently connected to the central drive shaft 471. Four Motor-Generator gears 482–485 are center mounted and permanently attached to four Motor-Generator gear drive shafts 486–489. These four Motor-Generator gear drive shafts are mounted on the base platform 473 by four Motor-Generator gear drive shaft mountings 490–493. Each Motor-Generator has a Motor-Generator drive shaft 494–497, and a Motor-Generator clutch plate 498–501 that is mounted on the Motor-Generator drive shaft. For each Motor-Generator the Motor-Generator gear, the Motor-Generator drive shaft, and the Motor-Generator clutch plate rotate on a common axis. For each Motor-Generator the Motor-Generator clutch plate can be engaged with the Motor-Generator gear, as shown for Motor-Generator 476 where Motor-Generator clutch plate 500 is in contact with Motor-Generator gear 484. When a Motor-Generator clutch plate is engaged with a Motor-Generator gear, the engagement is such that there is no slippage for the maximum torque the Motor-Generator functions at. When a Motor-Generator clutch plate is engaged with a Motor-Generator gear, the Motor-Generator can drive the vehicle when functioning as a motor, and can be mechanically driven by the vehicle when functioning as a generator. For each Motor-Generator the Motor-Generator clutch plate can be disengaged with the Motor-Generator gear, as shown for Motor-Generator 475, where Motor-Generator clutch plate 499 is not in direct contact with Motor-Generator gear 483. When a Motor-Generator clutch plate is not engaged with a Motor-Generator gear, the Motor-Generator gear is rotated by one of the central drive gears 478–481, however the Motor-Generator clutch plate and Motor-Generator do not rotate according to the rotation of any central drive gear. Thus, disengagement of an idle Motor-Generator's clutch plate from the Motor-Generator gear results in greater overall mechanical efficiency of the vehicle.

Figure 3:
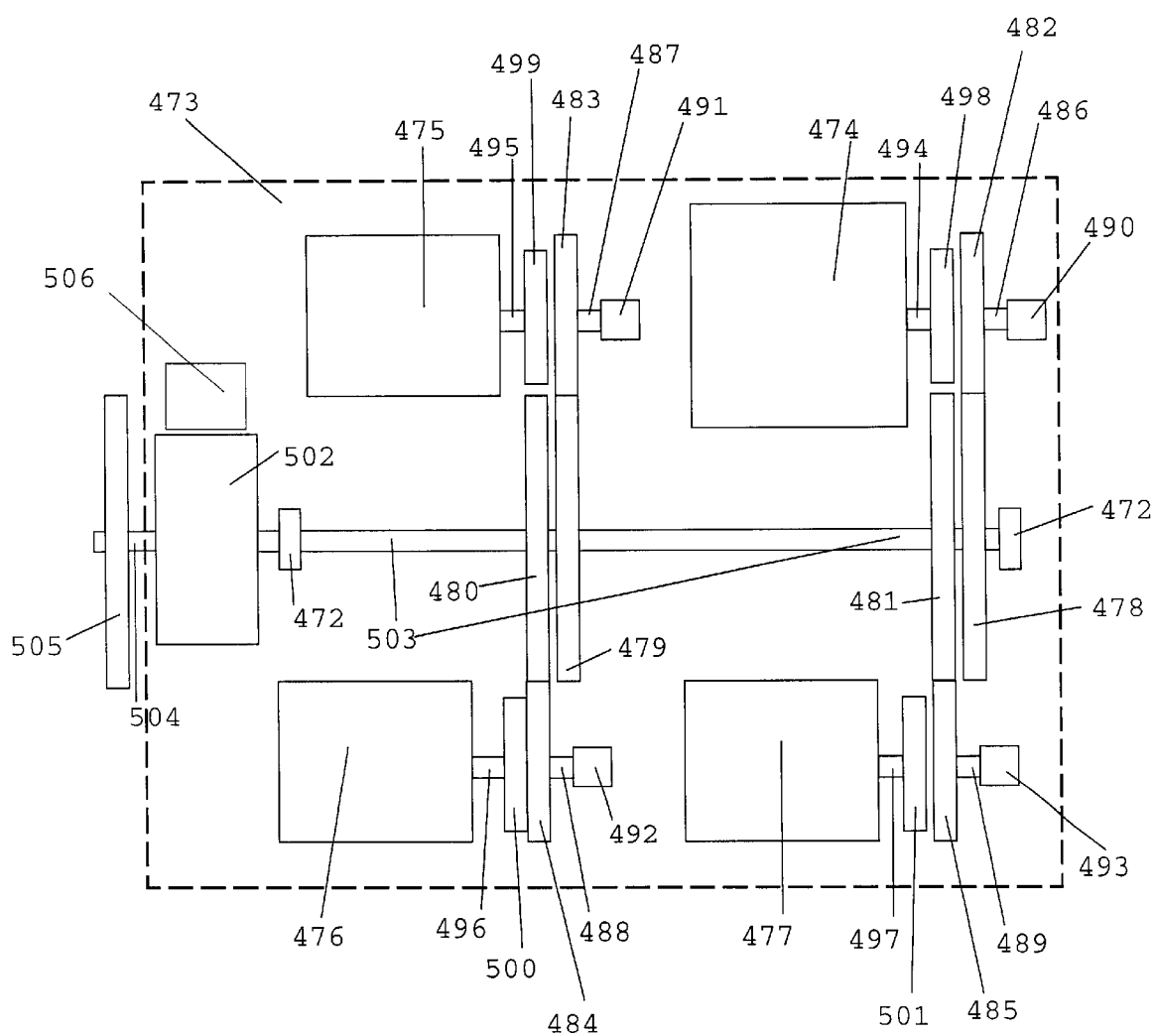
FIG. 3: Motor-Generator and related component set B for pedal-electric vehicle, top view.

FIG. 3 is identical to FIG. 2 except for the addition of a transmission gearbox 502, the addition of a transmission gearbox controller 506, and the separation of the sprocket and drive shaft assembly 401 of FIG. 1 into three components, first a central drive shaft 503 that is similar to the central drive shaft 471 of FIG. 2 and that is connected to the same central gears and mountings in FIG. 3 as in FIG. 2, second a gearbox drive shaft 504, and third a sprocket 505. FIG. 3 serves to illustrate that a transmission gearbox such as gearbox 502 and a transmission gearbox controller such as controller 506 can be used to control and vary the ratio of the speed of rotation between one or more wheels of a vehicle of the present invention and the speed of rotation of the central drive shaft 503. The transmission gearbox controller 506 can be entirely driver-operated, or entirely automated based on a system to measure parameters such as vehicle speed and acceleration, or can have a combination of manual and automated features. Although a transmission gearbox is illustrated in FIG. 3, various other kinds of transmission devices can also be used, and such transmission devices can be operated solely or partly by mechanical means such as mechanical toggles, levers, cables and cable housing.

Figure 4:
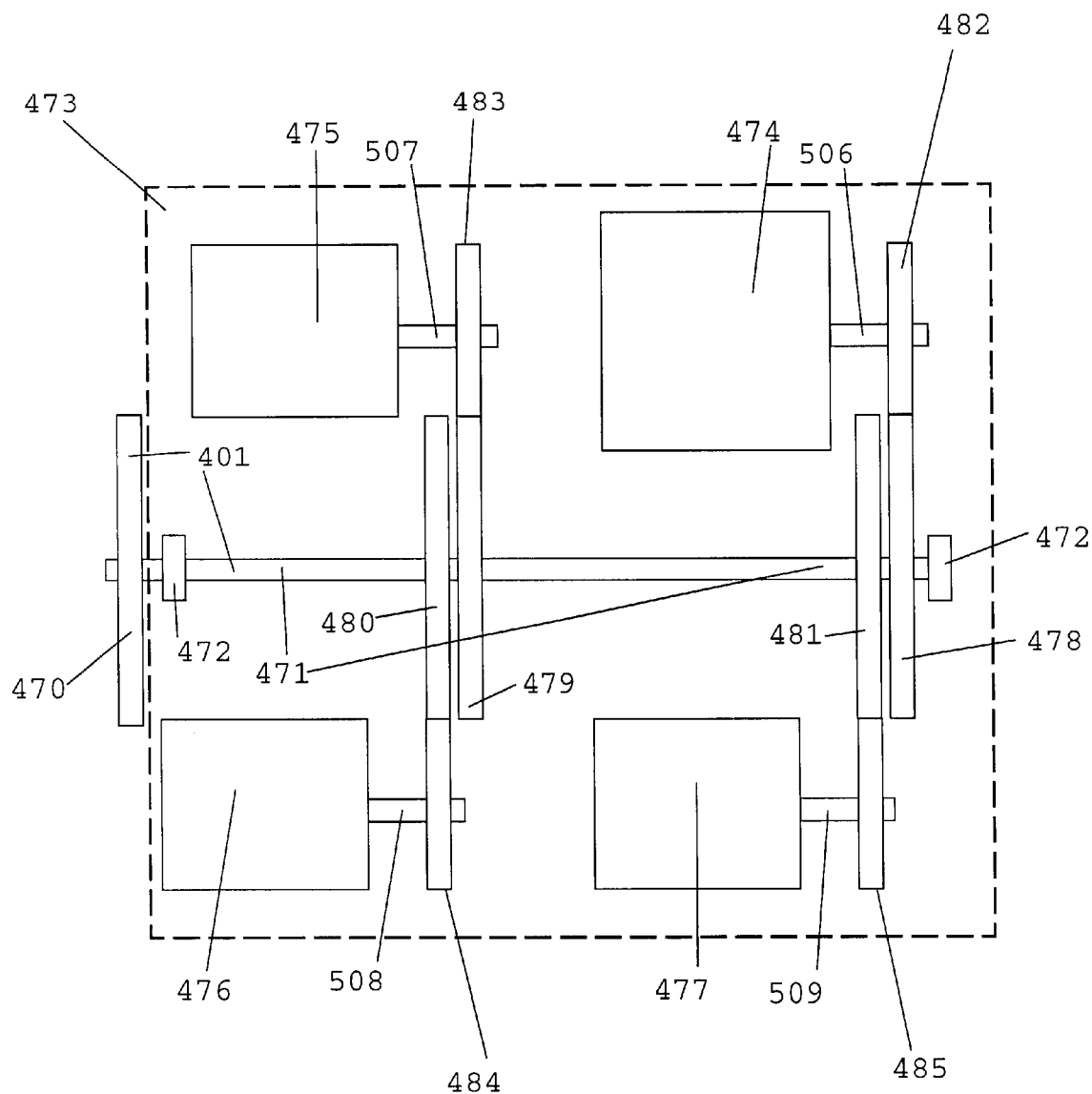
FIG. 4: Motor-Generator and related component set C for pedal-electric vehicle, top view.

FIG. 4 is identical to FIG. 2 except for the absence of Motor-Generator clutch plates 498–501, the absence of Motor-Generator gear drive shafts 486–489, the absence of Motor-Generator gear drive shaft mountings 490–493, and the substitution of longer Motor-Generator drive shafts 506–509 for the Motor-Generator drive shafts 494–497 of FIG. 2. Each Motor-Generator gear 482–485 is center mounted and permanently connected to a Motor-Generator drive shaft 506–509, and for each Motor-Generator the drive shaft and the gear rotate on a common axis. Thus, there is always a direct mechanical connection between each Motor-Generator 474–477 and the central drive shaft 471. This results in a loss of mechanical efficiency compared to the design of FIG. 2, because for the design of FIG. 4 idle Motor-Generators rotate whenever the vehicle moves. However this is a simpler design and is less expensive to build.

Figure 5:
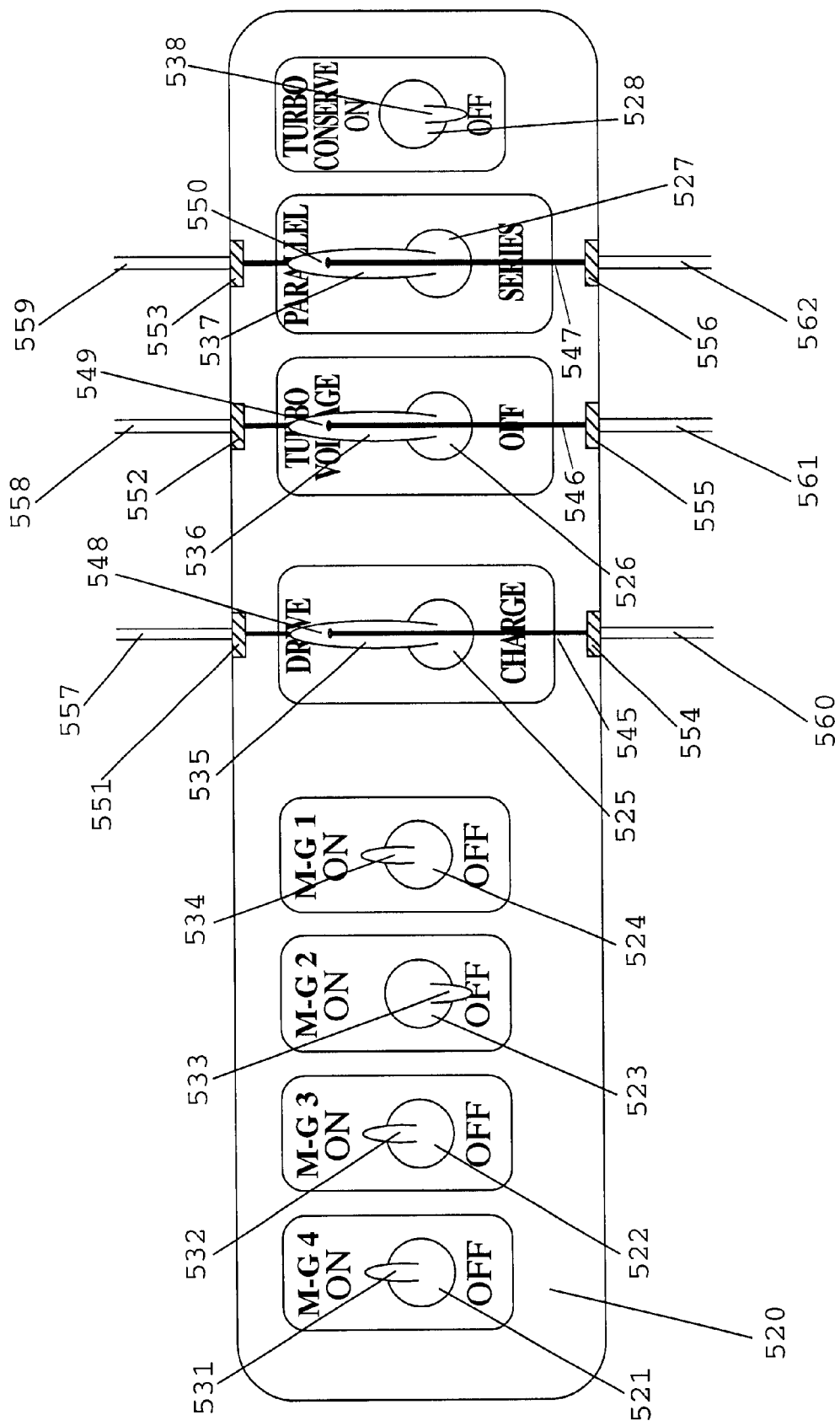
FIG. 5: Driver control means panel for pedal-electric vehicle, front view.

FIG. 5 illustrates a driver control means panel of the present invention, such as the driver control means panel 441 of FIG. 1. The control means illustrated in FIG. 5 are specific to details of Circuit Design A that will be later described with reference to FIGS. 9–13. Each of the switches 521–528 of FIG. 5 is a toggle switch with two settings, set by the position of the toggles 531–538. Switches 521–528 are all mounted on driver control means panel 520. Toggle switches 531–534 each allow individual driver control of one Motor-Generator of the present invention. FIG. 5 illustrates Motor-Generators 1, 3 and 4, controlled by toggle switches 524, 522 and 521 respectively, as being on, and Motor-Generator 2, controlled by toggle switch 523, as being off. Thus, when a power control switch is on, such as the power control switch 451 of FIG. 1, Motor-Generators 1, 3 and 4 would operate and would function according to the settings of toggle switches 525 and 526. However, as will be seen later, when the vehicle is in charging, mode and the Parallel/Series multi-switch 527 is set to series, this switch 527 setting overrides any effect of the settings of Motor-Generator toggle switches 521–524. Switch 538 determines whether a certain battery is supplying power in driving mode when Turbo Voltage is off, but does not affect the control of switches 521–524 to operate individual Motor-Generators in driving mode.

Figure 7:
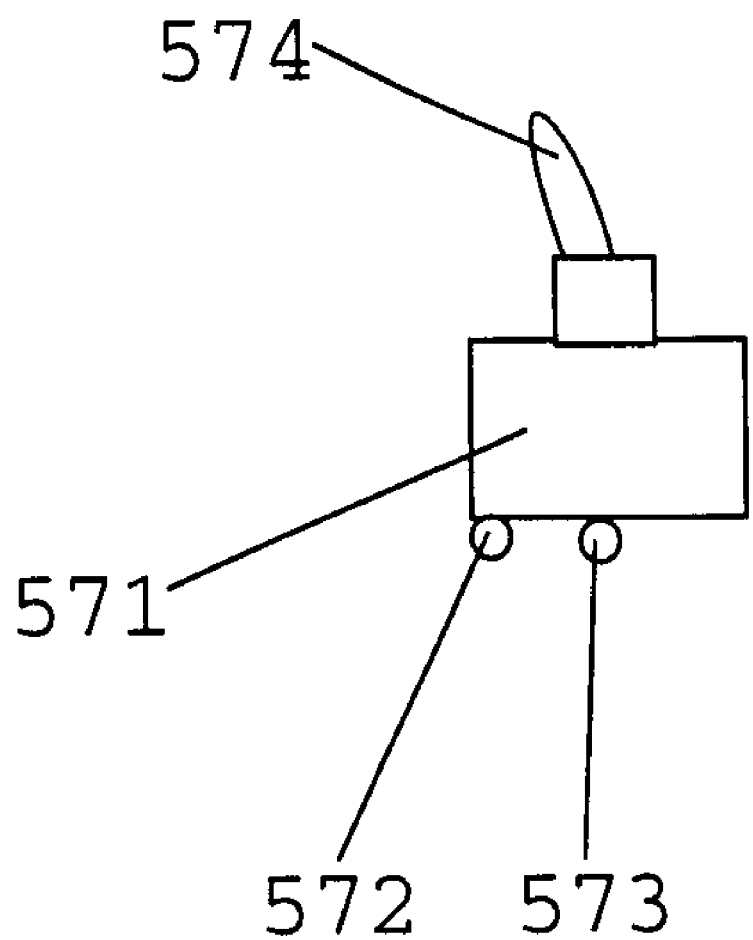
FIG. 7: Individual single circuit on-off electric toggle switch, side view.

Continuing to refer to FIG. 5, switches 521–524 and 528 are all conventional, commercially available on-off toggle switches. Referring to FIG. 7, switch 571 is a side view of a commercially available on-off toggle switch such as the switches 521–524 and 528 of FIG. 5. Continuing to refer to FIG. 7, such a toggle switch has two wire connecting points 572–573. When the toggle 574 is in the On position, the 572–573 circuit is on, and when the toggle 574 is in the Off position, the 572–573 circuit is off. Switches of the type of switch 571 will be termed a single circuit on-off electrical toggle switch.

Figure 6:
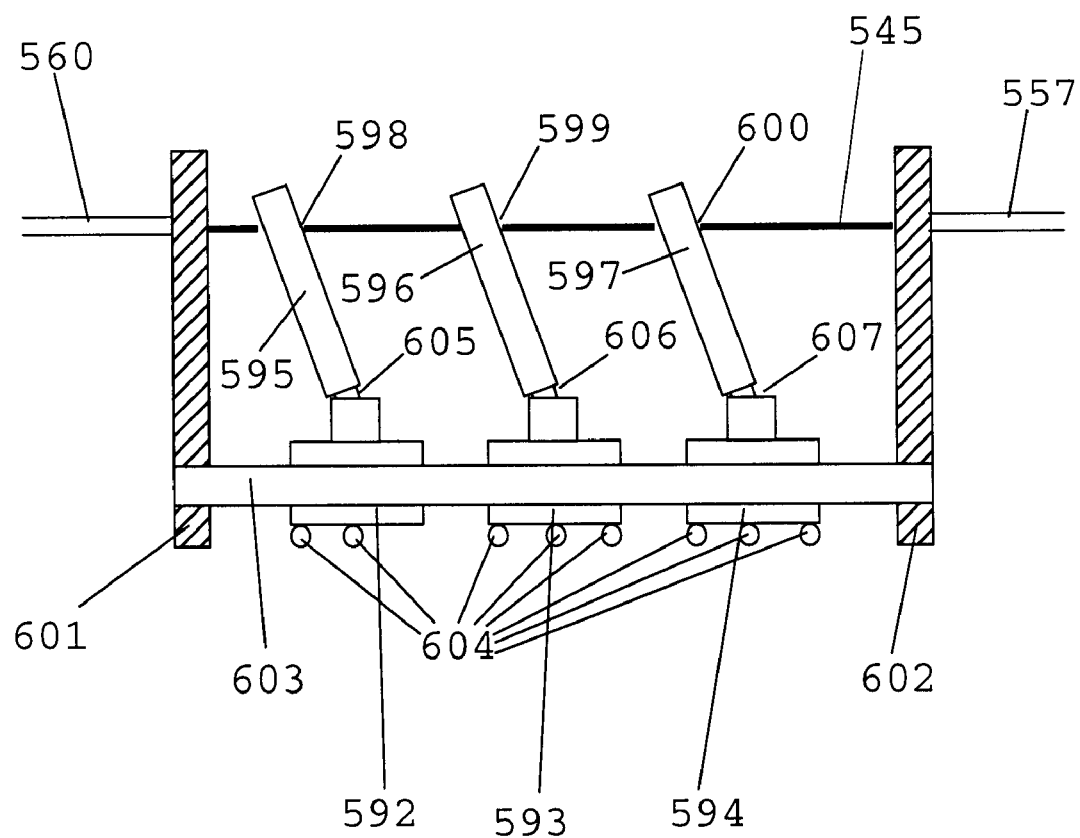
FIG. 6: Multi-switch components, side view.

Referring to FIG. 5, switches 525–527 are multi-switches. Each multi-switch 525–527 controls multiple individual on-off toggle switches, via cable and cable housing. Referring to multi-switch 525, a cable 545 is permanently connected to the multi-switch toggle 535 at connecting point 548 near the top of the toggle, such that when the multi-switch toggle 535 moves, the cable 545 moves. The cable 545 is housed in cable housing sections 557 and 560, and these cable housing sections 557 and 560 are connected to the driver control means panel 520 by mountings 551 and 554 respectively. The cable 545 of FIG. 5 is a continuous loop of cable. FIG. 6 is an illustration of a continuation of the cable 545 and the cable housings 557 and 560 that are illustrated in both FIG. 5 and FIG. 6. Continuing to refer to FIG. 6, three electrical switches 592–594 are mounted on a multi-switch panel board 603. Whereas in FIG. 5 one end of cable housing 557 is connected to driver control means panel 520 via mounting 551, FIG. 6 illustrates the other end of the same cable housing 557 as connected to multi-switch panel board 603 by mounting 602. Whereas in FIG. 5 one end of cable housing 560 is connected to driver control means panel 520 via mounting 554, FIG. 6 illustrates the other end of the same cable housing 560 as connected to multi-switch panel board 603 by mounting 601. Because cable 545 runs through the two cable housings 557 and 560, it can be seen that cable 545 forms a loop. Referring to FIG. 6, cable 545 is permanently connected to three toggle extensions 595–597 at points 598–600 near the top of each toggle extension. Thus, when toggle 535 of FIG. 5 is moved back and forth, FIG. 6 illustrates that the toggles 605–607 of the three electrical toggle switches 592–594 are also moved mechanically back and forth by means of the cable 545 and the toggle extensions 595–597.

Figure 8:
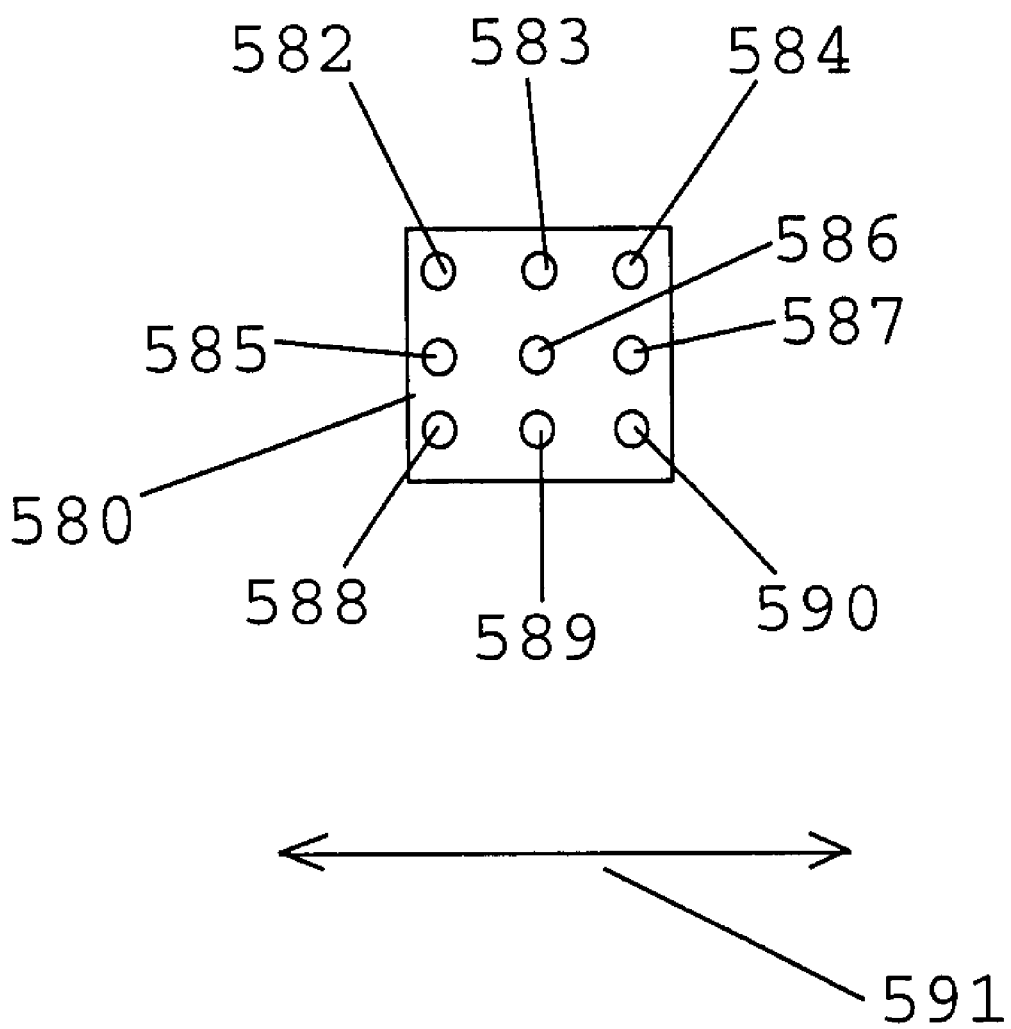
FIG. 8: Individual multiple circuit on-off electric toggle switch, bottom view.

FIG. 8 illustrates a bottom view of a conventional commercially available electrical on-off toggle switch 580, having multiple electrical circuits. The toggle of switch 580, not illustrated in the bottom view of FIG. 8, moves parallel to the line of direction 591. The toggle of switch 580 has two possible positions, toggle position A and toggle position B. Wire connecting point 583 is common to wire connecting points 582 and 584, such that for the switch 580 toggle position A circuit 582–583 is on and circuit 583–584 is off, whereas for the switch 580 opposite toggle position B circuit 582–583 is off and circuit 583–584 is on. Similarly for wire connecting points 585–587 and 588–590, for switch 580 toggle position A circuits 585–586 and 588–589 are on and circuits 586–587 and 589–590 are off, whereas for the switch 580 opposite toggle position B circuits 585–586 and 588–589 are off and circuits 586–587 and 589–590 are on. Thus, the toggle of switch 580 controls up to six different circuit sections provided the circuit sections can be organized into pairs of two circuit section such that each pair of circuit sections has a common circuit point. Alternatively, up to three different circuit sections can be controlled by switch 580 if no circuit section has a common point with any other circuit section. Switches of the type of switch 580, that can operate multiple circuits, will be called multiple circuit on-off electrical toggle switches.

Referring to FIG. 6, switches 593 and 594 are multiple circuit on-off electrical toggle switches, and switch 592 is a single circuit on-off electrical toggle switch.

Although FIG. 6 illustrates only one row of switches 592–594, it would be possible to use an array of switches such that cable 545 is permanently linked to and moves a toggle extension such as toggle extension 595 for each switch in the array. Thus a single driver operated multi-switch such as multi-switch 525 of FIG. 5 can operate an array of a combination of single circuit on-off electrical toggle switches and/or multiple circuit on-off electrical toggle switches. As an example, as will be seen in the description of Circuit Design A, the Drive/Charge multi-switch of FIG. 5 is used to control 26 individual circuit sections.

Figure 9:
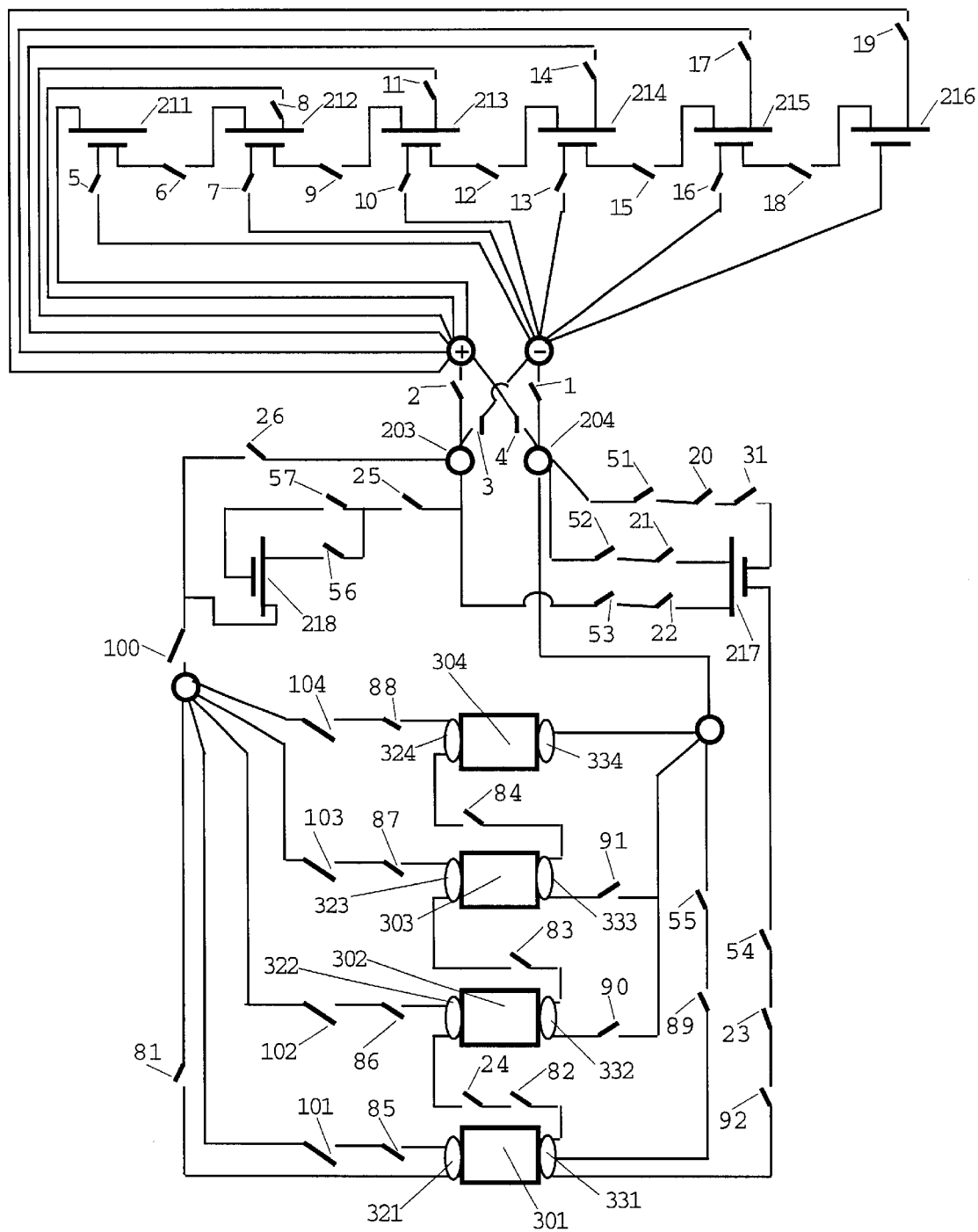
FIG. 9: Circuit Design A

FIGS. 9 through 13 all illustrate the same circuit design, termed Circuit Design A. This circuit design is based on a prototype of the invention that has been built, and thus has specific design parameters such as voltage levels and power outputs. Referring to FIG. 9, the four boxes 301–304 represent four Motor-Generators. Each Motor-Generator has two connecting points. The ovals representing points 321–324 are termed the positive Motor-Generator connecting points, and the ovals representing points 331–334 are termed the negative Motor-Generator connecting points. When the positive and negative Motor-Generator connecting points of a Motor-Generator are connected to an electromotive force (EMF) source's positive and negative poles respectively, this electrical connection of the Motor-Generator and the Motor-Generator's mechanical connection to one or more vehicle wheels are such that when the vehicle is in driving mode the Motor-Generator operates as a motor and drives the vehicle forward. When the positive and negative Motor-Generator connecting points of a Motor-Generator are connected to an EMF source's negative and positive poles respectively, this electrical connection of the Motor-Generator and the Motor-Generator's mechanical connection to one or more vehicle wheels are such that when the vehicle is in charging mode the Motor-Generator can operate as a generator and can charge charge-drive battery cell components. Operating as motors, Motor-Generator 301 produces 1/14 HP at 12V, and Motor-Generators 302–304 all produce 1/35 HP at 12V. Circuit Design A is such that Motor-Generator 301 can be operated as a motor at voltages of 12V and 30V, while Motor-Generators 302–304 can be operated as motors at voltages of 12V and 18V. Circuit element 217 is a 12V turbo battery. Circuit element 218 is a 6V turbo battery. Circuit elements 211–216 are each 2V charge-drive battery cells. The small circular circuit elements such as 204 are convenient common connecting points for multiple wires. Points 203–204 are termed EMF points, these are points at which Motor-Generators 301–304 can use battery cells 211–216 as an EMF source when the vehicle is in driving mode, and alternatively can function as an EMF source for charging battery cells 211–216 when the vehicle is in charging mode.

The switches shown as symbols in the circuit design of FIGS. 9 through FIG. 13 are each individual on-off toggle electrical switches. Referring to FIG. 9, power control switch 100, shown as 451 in FIG. 1, prevents any Motor-Generator from functioning as either a motor or a generator. Switches 101–104 of FIG. 9 correspond to the switches 524, 523, 522 and 521 of FIG. 5 respectively, and are individually operated by the driver to turn individual Motor-Generators on and off. Switch 31 of FIG. 9 is a driver operated switch called a Turbo Conserve switch, corresponding to switch 528 of FIG. 5. It is better to think of any driver controlled switch according to the function and modes of the switch from the driver's point of view rather than actual electrical switch on-off positions. When Turbo Conserve is in On mode, the driver knows that charge in turbo batteries is being conserved, and this is implemented by setting switch 31 to off, to prevent turbo battery 217 from functioning in parallel with the EMF of EMF points 203–204 and to allow current to be drawn from turbo battery 217 only when connected in series with the EMF of EMF points 203–204. Thus, Turbo Conserve On mode turns switch 31 off, and Turbo Conserve Off mode turns switch 31 on. The remaining individual on-off toggle switches are controlled by driver-operated multi-switches, and are numbered such that all the individual switches controlled by one multi-switch are in one range of numbers. FIGS. 10 through 13 illustrate the circuit based on the mode settings of the multi-switches 525–527 that are illustrated in FIG. 5, with individual on-off switches illustrated as on or off according to the multi-switch mode, to depict the function of the multi-switch modes. The purpose and modes of the multi-switches and the range of switch numbers controlled by each multi-switch group of the circuit design illustrated in FIGS. 9 through 13 are first summarized, and are then described in fuller detail with reference to the illustrations of specific multi-switch settings of FIGS. 10–13.

Referring to FIG. 9, switches 1–26 are controlled by a driver operated Charge/Drive multi-switch. In Charge mode, the Charge/Drive multi-switch connects charge-drive battery cells 211–216 in parallel and sets EMF point 204 at 2V above EMF point 203, allowing Motor-Generator components to function as generators to charge battery cells 211–216. In Drive mode, the Charge/Drive multi-switch connects charge-drive battery cells 211–216 in series and sets EMF point 203 at 12V above EMF point 204, allowing Motor-Generator components to draw current at 12V from points 203–204.

Continuing to refer to FIG. 9, switches 51–57 are controlled by a driver operated Turbo Voltage multi-switch.

When the Charge/Drive multi-switch is in Drive mode, EMF point 203 is 12V above EMF point 204, and EMF points 203–204 function as an EMF source for the Motor-Generators. In Turbo Voltage On mode, turbo batteries 217 and 218 are used in series with the EMF source of EMF points 203–204. In Turbo Voltage Off mode, the 6V turbo battery 218 is not used as an EMF source, and switches 51–53 function to connect the 12V turbo battery 217 in parallel with the EMF source of EMF points 203–204 when Turbo Conserve is in Off mode and switch 31 is on.

Continuing to refer to FIG. 9, switches 81–92 are controlled by a driver operated Parallel/Series multi-switch. In Parallel mode, Motor-Generators 301–304 operate in parallel and each can be independently driver operated. In Series mode Motor-Generators 301–304 all operate in series, and individual driver operated switches 101–104 for these Motor-Generators are bypassed.

Figure 10:
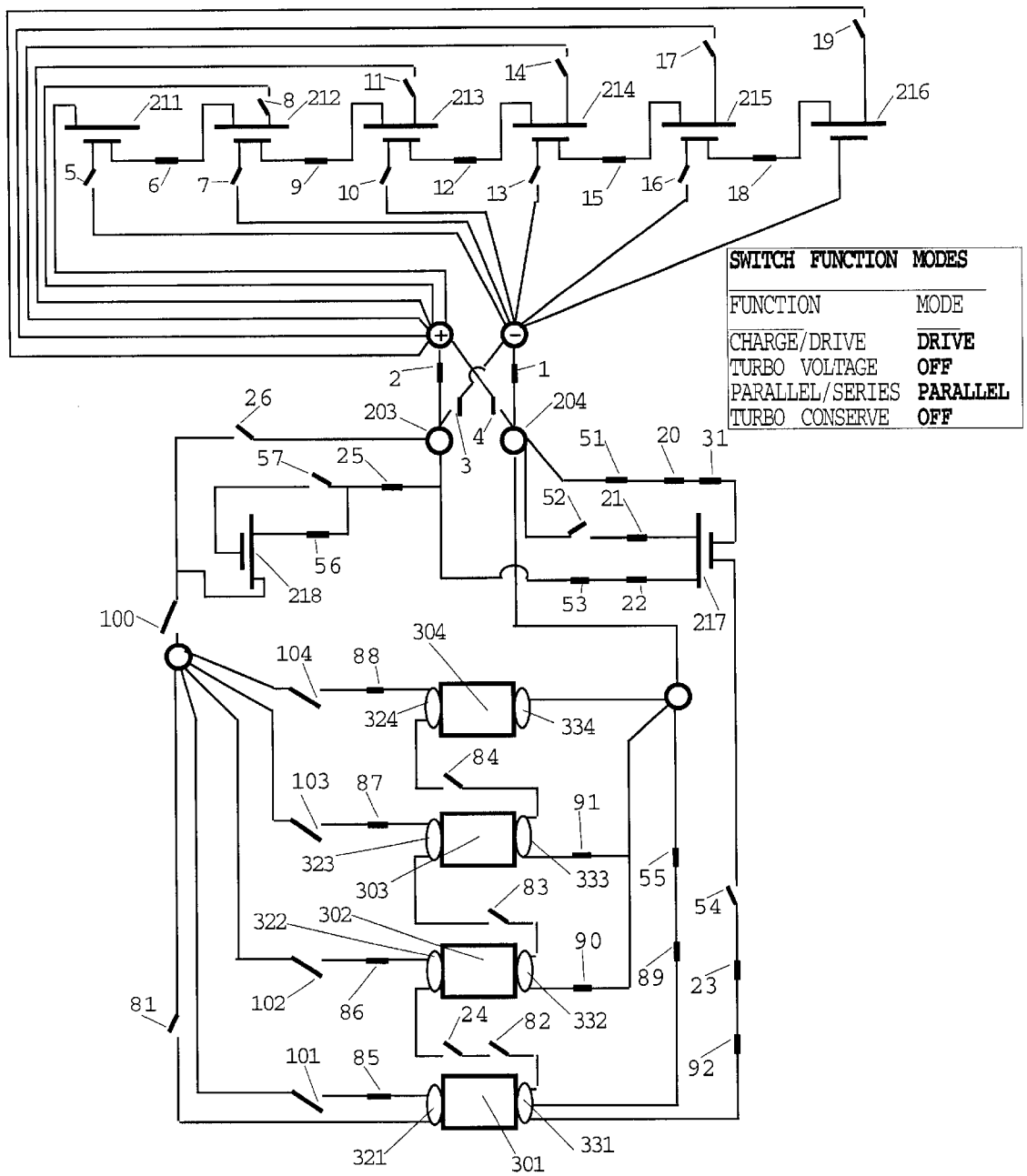
FIG. 10: Circuit Design A switch settings: A1 circuit configuration

FIG. 10 illustrates Circuit Design A when the Charge/Drive multi-switch is in Drive mode, the Turbo Voltage multi-switch is in Off mode, the Parallel/Series multi-switch is in Parallel mode, and the Turbo Conserve switch is in Off mode. Regarding the Charge/Drive individual switches 1–26, it can be seen that in Drive mode switches 6, 9, 12, 15 and 18 are on, connecting battery cell components 211–216 in series. Switches 5, 7, 8, 10, 11, 13, 14, 16, 17, and 19 are all off, preventing any parallel connection of battery cell components 211–216. Switches 1 and 2 are on, setting EMF point 203 at 12V above EMF point 204. Switches 3 and 4 can reverse the voltage difference between EMF points 203 and 204, but these two switches are off. Switches 20–26 have the function of affecting whether circuit sections that are also controlled by other multi-switches are closed or open. Switches 20, 21 and 22 are on when the Charge/Drive multi-switch is in Drive mode. Thus, when the Turbo Voltage multi-switch is in Off mode as shown in FIG. 10, switches 51 and 53 of the Turbo Voltage switch group are on, and the 12V turbo battery 217 is connected in parallel with the 12V of the EMF source of EMF points 203 and 204. Switch 23 is on when the Charge/Drive multi-switch is in Drive mode, making it possible for switches 54 and 92 to complete a circuit section between the negative pole of turbo battery 217 and the negative Motor-Generator connecting point 331 of Motor-Generator 301. The function of this circuit section is described later. Switch 24 is off when the Charge/Drive multi-switch is in Drive mode, preventing the operation of circuit section 331-82-24-322. Because this circuit section must operate for all of the Motor-Generators to operate in series, switch 24 has the effect of disabling the Series mode of the Parallel/Series multi-switch when the Charge/Drive multi-switch is in Drive mode. Switch 25 is on when the Charge/Drive multi-switch is in Drive mode. Thus, when the Turbo Voltage multi-switch is in Off mode, switch 56 is on, and completes circuit section 203-25-56-100, connecting EMF point 203 directly to power control switch 100 and bypassing the EMF of turbo battery 218. Switch 26 is off when the Charge/Drive multi-switch is in Drive mode, preventing a direct connection between EMF point 203 and power control switch 100 via circuit section 203-26-100, thus allowing Turbo Voltage switch group switches 56 and 57 to determine whether EMF point 203 and power control switch 100 are connected directly while bypassing the EMF of turbo battery 218, or are connected via a circuit section that includes the EMF of turbo battery 218 in series with the EMF of EMF points 203–204.

Continuing to refer to FIG. 10, we now focus on the function of the Turbo Voltage switches 51–57. When Charge/Drive is in Drive mode and Turbo Voltage is in Off mode, Turbo Voltage switches 51–57 serve to operate circuits such that all Motor-Generators can receive EMF at 12V from the EMF of EMF points 203–204. Thus, switches 51 and 53 are on, and connect turbo battery 217 in parallel with EMF points 203 and 204. Switch 52 is off, preventing the operation of the circuit section 217-21-52-204 that would connect turbo battery 217 in series with EMF point 204 rather than in parallel. Switch 54 is off, to prevent the negative pole of turbo battery 217 from being connected to the negative Motor-Generator connecting point 331 of Motor-Generator 301. Switch 55 is on, allowing circuit section 331-89-55-204 to connect the negative Motor-Generator connecting point 331 of Motor-Generator 301 and EMF point 204. Switch 56 is on and switch 57 is off, thus connecting EMF point 203 directly with power control switch 100 and bypassing the EMF of turbo battery 218.

Continuing to refer to FIG. 10, we now focus on the function of the Parallel/Series switches 81–92. When the Parallel/Series multi-switch is in Parallel mode, Motor-Generators 301–304 can each be individually operated via driver-controlled switches 101–104. Thus, switches 85–88 and 89–91 are all on, to allow Motor-Generators 301–304 to be individually connected to EMF points 203 and 204 directly, or via turbo battery 218 if Turbo Voltage were to be On. Switch 92 is also on, so that if Turbo Voltage were to be On, Motor-Generator 301 would be connected to a 30V EMF source that includes in series both turbo batteries 217 and 218 and the EMF of EMF points 203–204. Switches 81–84 are used to allow Motor-Generators 301–304 to function in series independently of driver operated switches 101–104, and thus in Parallel mode switches 81–84 are all off.

Figure 11:
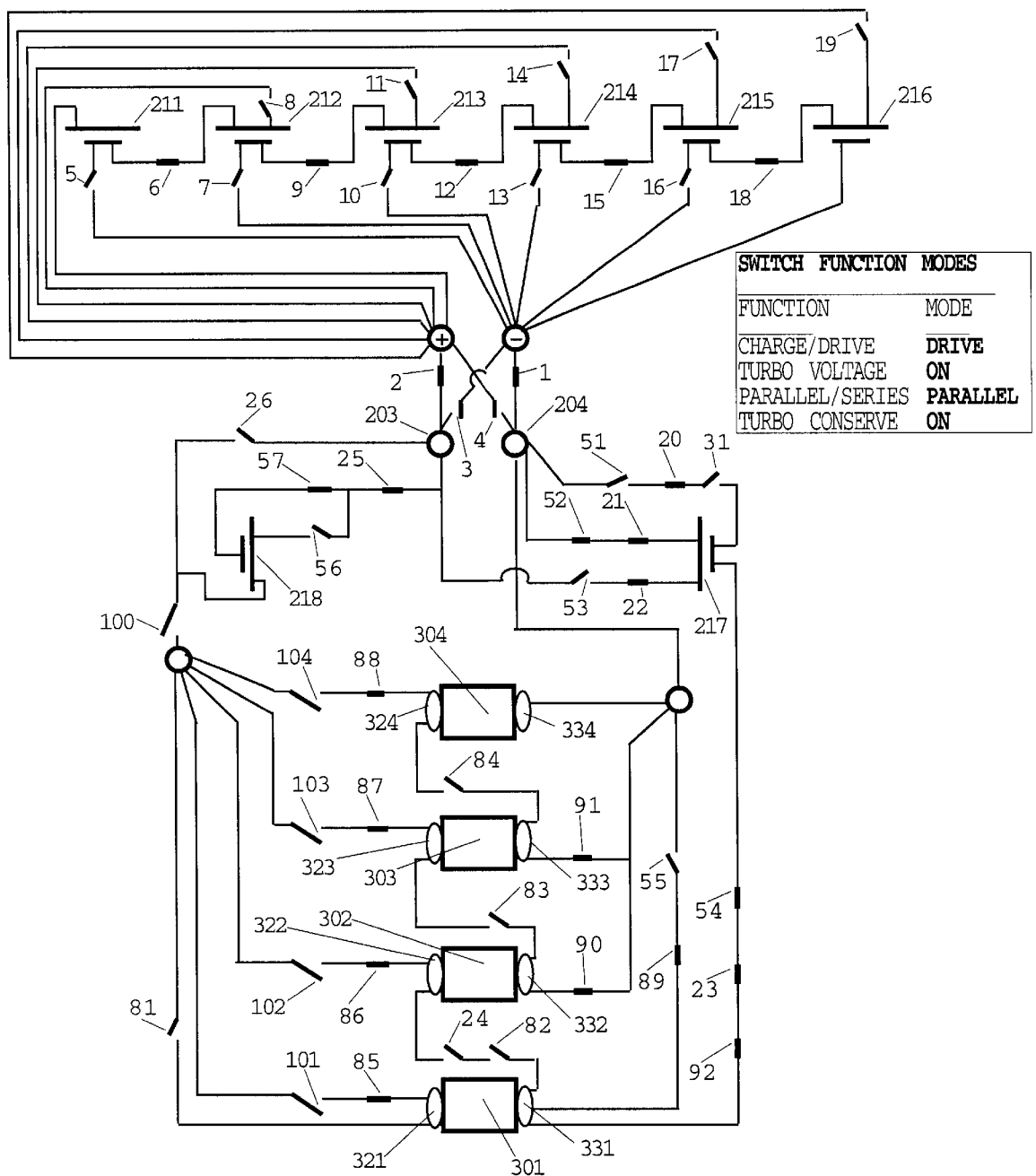
FIG. 11: Circuit Design A switch settings: A2 circuit configuration

FIG. 11 illustrates Circuit Design A when the Charge/Drive multi-switch is in Drive mode, the Turbo Voltage multi-switch is in On mode, the Parallel/Series multi-switch is in Parallel mode, and the individual operator-controlled Turbo Conserve switch is in On mode. When Charge/Drive is in Drive mode and Turbo Voltage is in On mode, Turbo Voltage switches 51–57 serve to operate circuits such that all Motor-Generators can receive EMF at voltages above 12V via circuits that include one or more turbo batteries in series with the 12V EMF of EMF points 203–204. When the Charge-Drive multi-switch is in Drive mode, switch 25 is on and switch 26 is off, meaning that any circuit path connecting any Motor-Generator point 321–324 to EMF point 203 via power control switch 100 must include either switch 57 or switch 56. In Turbo Voltage On mode, switch 57 is on and switch 56 is off, consequently any Motor-Generator operating as a motor is driven by the 6V turbo battery 218 in series with the 12V EMF of EMF points 203–204. Thus, Motor-Generators 302–304 are all driven at 18V through a circuit section that includes 204-203-25-57-218-100. Regarding Motor-Generator 301, in Turbo Voltage On mode switches 51, 53 and 55 are off, and switches 52 and 54 are on, therefore the negative Motor-Generator connecting point 331 of Motor-Generator 301 is connected to EMF point 204 only by circuit section 331-92-23-54-217-21-52-204, where turbo battery 217 is in series with the EMF of EMF points 203–204. Thus, in Turbo On mode Motor-Generator 301 operates at 30V through circuit 321-85-101-100-218-57-25-203-204-52-21-217-54-23-92-331.

Figure 12:
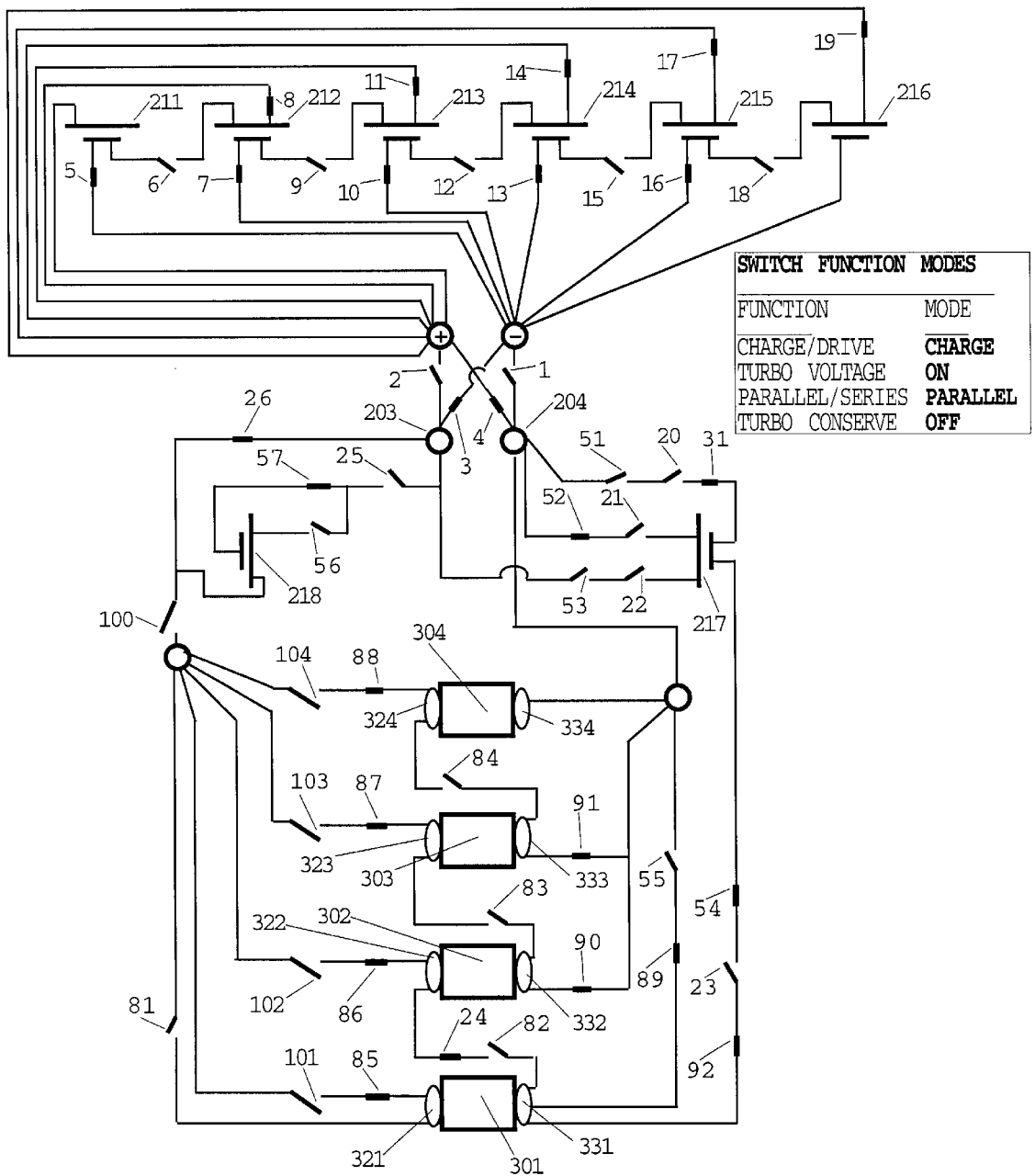
FIG. 12: Circuit Design A switch settings: A3 circuit configuration

FIG. 12 illustrates Circuit Design A when the Charge/Drive multi-switch is in Charge mode, the Turbo Voltage multi-switch is in On mode, the Parallel/Series multi-switch is in Parallel mode, and the individual driver controlled Turbo Conserve switch is in Off mode. Regarding the Charge/Drive individual switches 1–26, it can be seen that in Charge mode switches 6, 9, 12, 15 and 18 are all off, preventing any series connection of any of the battery cell components 211–216. Switches 5, 7, 8, 10, 11, 13, 14, 16, 17, and 19 are on, connecting battery cell components 211–216 in parallel to EMF points 201 and 202. Switches 1 and 2 are off, and switches 3 and 4 are on, thus establishing EMF point 204 at 2V above EMF point 203. Therefore, in Charge mode EMF point 204 is at a higher voltage than EMF point 203, whereas in Drive mode EMF point 204 is at a lower voltage than EMF point 203. When the vehicle moves forward and Motor-Generators are being mechanically driven in the same direction they rotate in when they drive the vehicle as motors, each Motor-Generator will have a potential difference between the Motor-Generator's positive and negative Motor-Generator connecting points (points 321–324 and points 331–334) such that for each Motor-Generator the Motor-Generator's positive Motor-Generator connecting point will be at a higher voltage than the Motor-Generator's negative Motor-Generator connecting point. This voltage difference increases as a function of the speed of rotation of the Motor-Generator's rotating sub-components. When the voltage difference between these two points is greater than 2V, the Motor-Generator will function as a generator, and current will flow from the Motor-Generator to charge the batteries 211–216. Thus, in Charge mode the Motor-Generators 301–304 function to charge the battery cells 211–216. Switches 20–23 are all off in Charge mode. Thus, in charge mode turbo battery 217 cannot function in parallel or series with any other EMF source in Circuit Design A. Similarly, Switch 25 is off in charge mode, and thus turbo battery 218 cannot function in parallel or series with any other EMF source in Circuit Design A. Switch 26 is on in Charge mode, establishing a circuit path between the driver operated power control switch 100 and EMF point 203.

Figure 13:
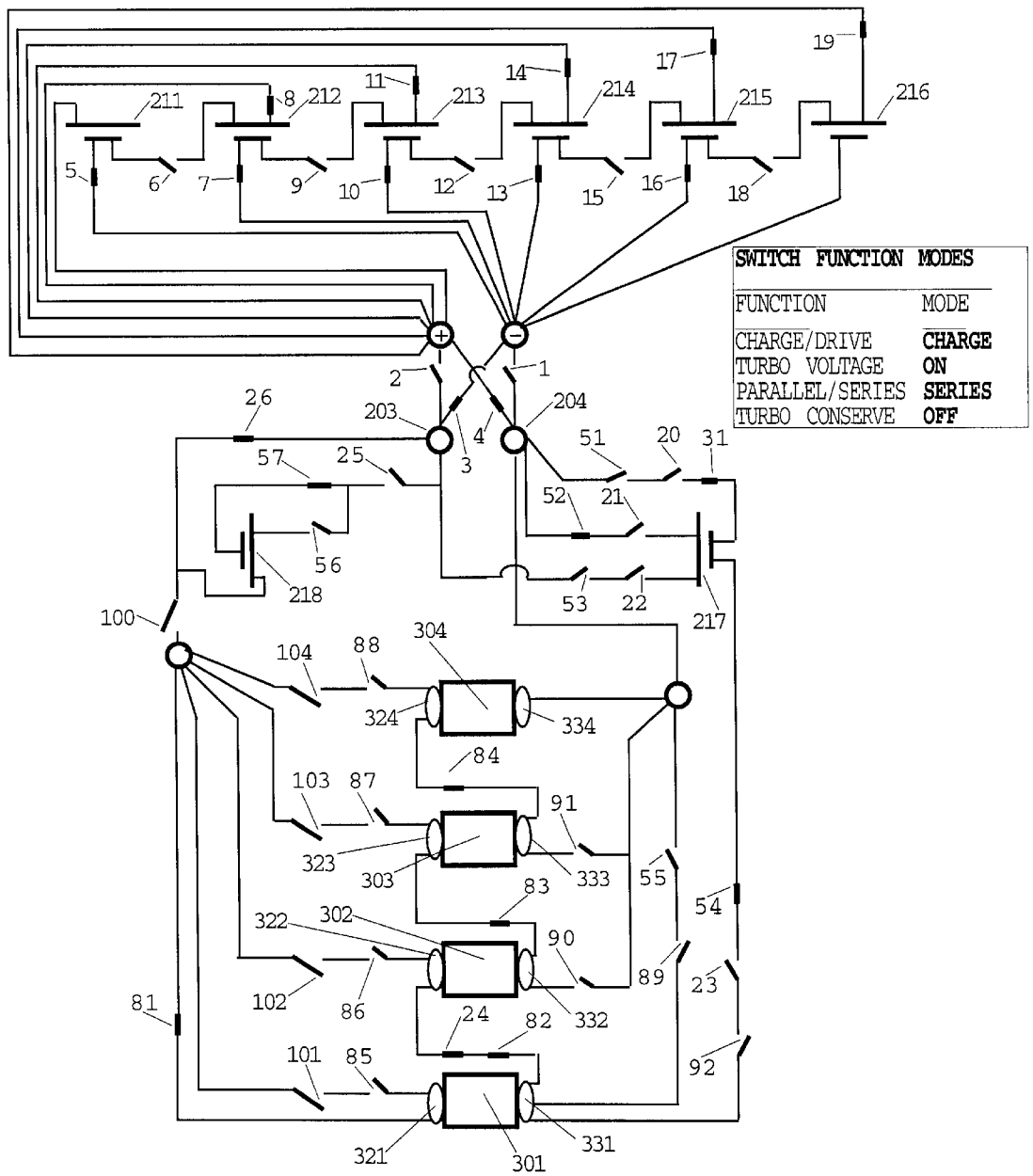
FIG. 13: Circuit Design A switch settings: A4 circuit configuration

FIG. 13 illustrates Circuit Design A when the Charge/Drive multi-switch is in Charge mode, the Turbo Voltage multi-switch is in On mode, the Parallel/Series multi-switch is in Series mode, and the individual operator-controlled Turbo Conserve switch is in Off mode. Regarding the Parallel/Series individual switches 81–92, it can be seen that for the Parallel/Series Series mode, switches 85–88 are all off, thus preventing the operation of any of the Motor-Generators 301–304 from being affected by the individual driver controlled Motor-Generator switches 101–104. Parallel/Series switch 81 is on, providing for a direct connection between power control switch 100 and positive Motor-Generator connecting point 321 of Motor-Generator 301. Parallel/Series switches 89 and 92 are off, preventing any connection of the negative Motor-Generator connecting point 331 of Motor-Generator 301 other than a series connection with Motor-Generator 302. Similarly, Parallel/Series switch 90 is off, preventing a connection of the negative Motor-Generator connecting point 332 of Motor-Generator 302 other than a series connection with Motor-Generator 303, and Parallel/Series switch 91 is off, preventing a connection of the negative Motor-Generator connecting point 333 of Motor-Generator 303 other than a series connection with Motor-Generator 304. The remaining Parallel/Series switches 82, 83 and 84 are on, and allow circuit section 203-26-100-81-321-331-82-24-322-332-83-323-333-84-324-334-204 to operate when power control switch 100 is on. However, note that if Charge/Drive was in Drive mode, switch 24 would be off and the circuit section would not operate. Therefore, the Turbo Voltage Series mode circuit can only operate when Charge/Drive is in Charge mode. The reason for this is that if the multi-switch settings were: Charge/Drive in Drive mode, Turbo Voltage in Off mode or On mode, and Parallel/Series in Series mode, all four Motor-Generators could be operated in series when no individual Motor-Generator switch 101–104 was on. The use of switch 24 to prevent all four Motor-Generators from operating in series whenever Charge/Drive is Drive mode follows from a design requirement to have all Motor-Generators entirely under the control of the individual driver operated Motor-Generator switches 101–104 whenever Charge/Drive is in Drive mode.

Operation of a pedal-electric vehicle of the present invention as illustrated and detailed with reference to FIGS. 1–13 is as follows:

The driver of the pedal-electric vehicle sits on the seat 400 shown in FIG. 1. When the power control switch 451 of FIG. 1 is off, the driver can operate the vehicle in all respects as a bicycle. In addition to operating the vehicle as a bicycle, the driver can also operate systems and components of the present invention by using the controls on the driver control means panel 520 of FIG. 5, shown as 441 of FIG. 1.

With reference to FIG. 5, to drive the vehicle forward with electric power, the driver typically first sets the Drive/Charge multi-switch 525 to Drive mode, and the Parallel/Series multi-switch 527 to Parallel mode. The driver then sets the Turbo Voltage multi-switch 526 to On or Off, according to whether more or less power is desired from each Motor-Generator. The driver then turns one or more of the Motor-Generators on by setting one or more of the Motor-Generator switches 521–524 to on. Finally, to activate the Motor-Generators, the driver depresses the button of the handlebar power control switch, illustrated on the left handlebar as 451 of FIG. 1. The vehicle moves forward, and is driven by more or less electric power depending on what set of Motor-Generators is operating, and depending on whether Turbo Voltage is in On or Off mode.

As the vehicle moves forward, the Driver can turn individual Motor-Generators on and off, and can vary the Turbo Voltage mode between On and Off, to increase or decrease the electric power used to drive the vehicle.

The vehicle is turned as a conventional bicycle. To stop the vehicle, the driver can always use conventional bicycle brakes, which function independently of any system of the present invention. The driver can also simply flip the Drive/Charge multi-switch from Drive mode to Charge mode. This can be done while the power-control switch is on, or alternatively the power control switch button can be briefly released, the Drive/Charge multi-switch can then be flipped to Charge mode, all, some or none of the Motor-Generator switches 521–524 can be set as off or on, and the power control switch button can then be re-depressed. When the Drive/Charge multi-switch is in Charge mode this causes the Motor-Generators to immediately stop functioning as motors and to start functioning as generators. The kinetic energy of the vehicle's forward motion is transformed into electrical charge in the batteries, and the vehicle slows down. The rate of deceleration is a function of both vehicle speed and the number of Motor-Generators that are on. The driver can turn on more Motor-Generators as the vehicle slows down, to achieve a rate of deceleration that is less a function of vehicle speed. As the vehicle speed reaches a point where the Motor-Generators operate at a potential difference between positive and negative Motor-Generator connecting points approaching two volts, the drive can flip the Parallel/Series switch to series, to increase the voltage and the rate of deceleration.

When the vehicle is moving downhill, the driver can both pedal and operate the vehicle with the Drive/Charge switch in Charge mode, the driver can vary between Parallel and Series mode, and in Parallel mode the driver can vary the set of Motor-Generators that are operating. Thus energy can be stored in the batteries, thereby increasing vehicle range, and the driver can gain additional exercise and/or a more steady rate of exercise.

When the vehicle is being operated on a level or even slightly uphill path, the driver can also operate the vehicle with the Drive/Charge switch in Charge mode and varying the use of the Parallel/Series multi-switch and the individual Motor-Generators, to store electrical energy and to use the vehicle as both a vehicle and a kind of non-stationary exercise machine. As a commuter, a driver may use vehicle control means to pedal only lightly for one half of the commute, not requiring a shower and change of clothing, and can use the vehicle for a heavy physical workout for the other half of the commute. Where electricity is scarce, unavailable, or expensive, individuals may use pedal-electric vehicles as both transportation and to generate electric power for later use in the course of their daily activities.

Regarding power control switches such as power control switch 100 of FIGS. 9–14, vehicles of the present invention can have multiple power control switches. Multiple power control switches can operate such that a first power control switch must be on to operate any or all Motor-Generators as motors, and a second power control switch must be off to operate any or all Motor-Generators as generators. Multiple power control switches can also operate such that whenever a power control switch that operates Motor-Generators as motors is on, no Motor-Generator can function as a generator, and, whenever a power control switch that operates Motor-Generators as generators is on, no Motor-Generator can function as a motor. With such a use of power control switches, whenever power control switches with conflicting functions are on, no Motor-Generator operates as either a motor or as a generator.

FIGS. 14–20 and the following detailed descriptions serve to introduce additional aspects of the present invention that will form the basis for claims.

Figure 14:
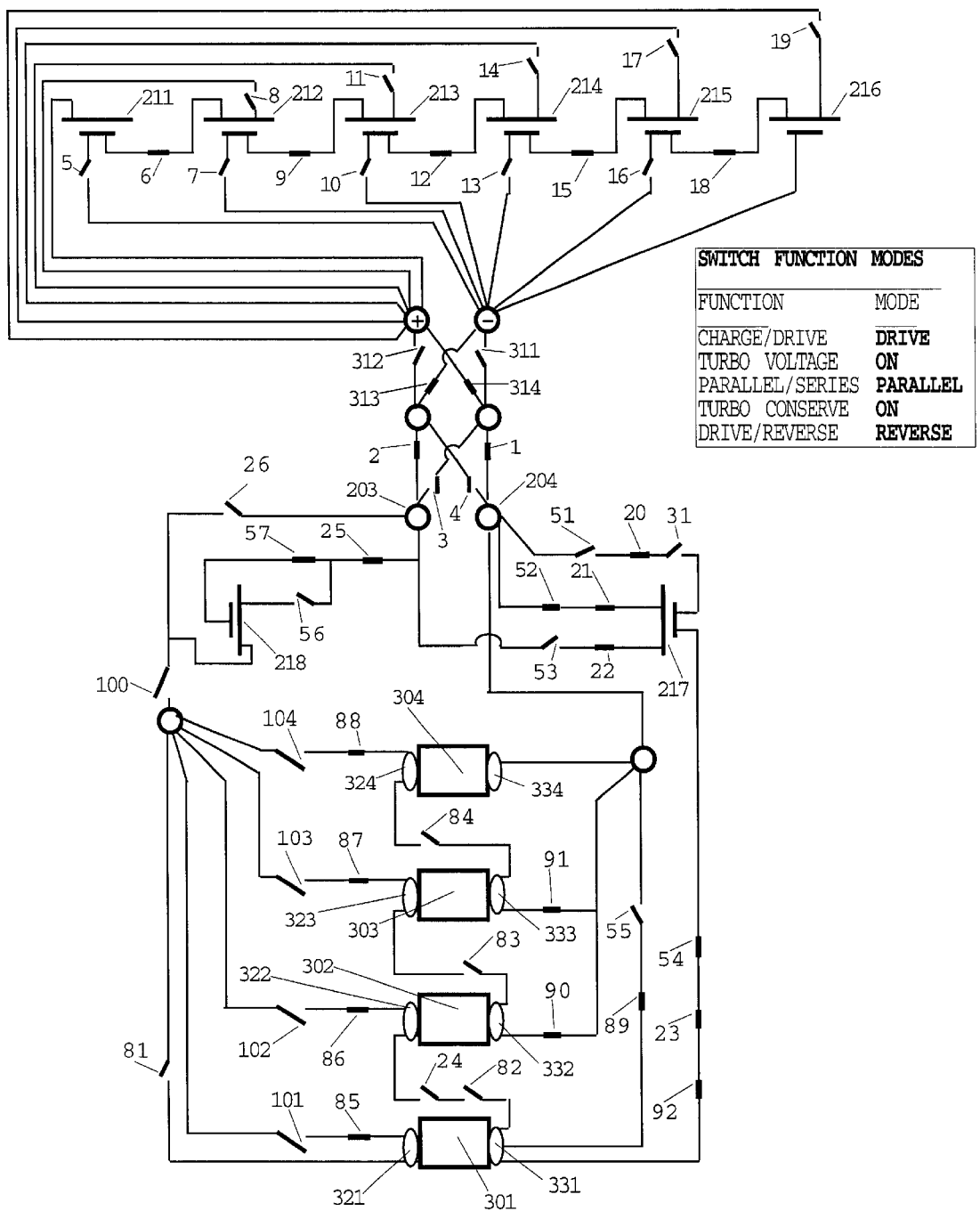
FIG. 14: Circuit Design A with addition of reverse multi-switch components

FIG. 14 is identical for all switches and settings to FIG. 11 except for the addition of new circuit sections with four new individual on-off switches 311–314. These are operated by a new driver controlled multi-switch called a Drive/Reverse multi-switch, shown in Reverse mode in FIG. 14. Because Circuit Design A is best suited for small, maneuverable pedal-electric vehicles, there was not the requirement of powering the vehicle in reverse. The purpose of FIG. 14 and the four new on-off switches of FIG. 14 is to illustrate that a Drive/Reverse mode can be included in circuit designs for vehicles of the present invention. The purpose of a Reverse mode is to use Motor-Generators of a vehicle of the present invention to drive the vehicle backward. The circuit of FIG. 14 accomplishes this by reversing the potential difference at EMF points 203–204. With the multi-switch modes set as shown in FIG. 14, when the Drive/Reverse multi-switch is in Reverse mode, switches 311–312 are off, and switches 313–314 are on, thus establishing point 204 at 12V higher than point 203. In contrast, as illustrated in FIG. 11 the same multi-switch mode settings for all but the absent Drive/Reverse multi-switches result in point 203 being 12V higher than point 204. The circuit of FIG. 14 operates in all other respects identically to the circuit of FIG. 11. Therefore, when the power control switch is on, a vehicle with the circuits and mode settings of FIG. 11 will be driven forward, and a vehicle with the circuits and mode settings of FIG. 14 will be driven backward. Additional switches could be added to the circuit of FIG. 14 that would be controlled by the Drive/Reverse multi-switch and that would prevent certain circuit sections from operating when the Drive/Reverse multi-switch was in Reverse mode. Additional switches could also be added that would be controlled by other multi-switches such that other multi-switch switches would affect the operation of reverse mode.

FIGS. 15–20 all pertain to a multiple circuit electrical switch that has been termed an array switch, and to an example of circuitry controlled by an array switch.

Figure 15:
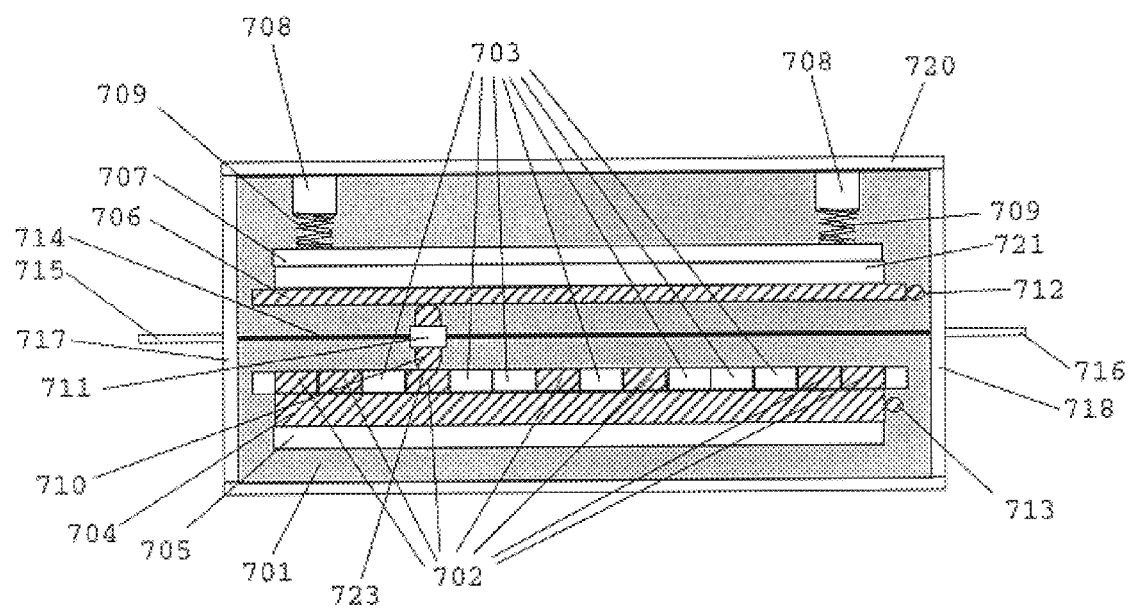
FIG. 15: Switch components for array switch, side view.
Figure 16:
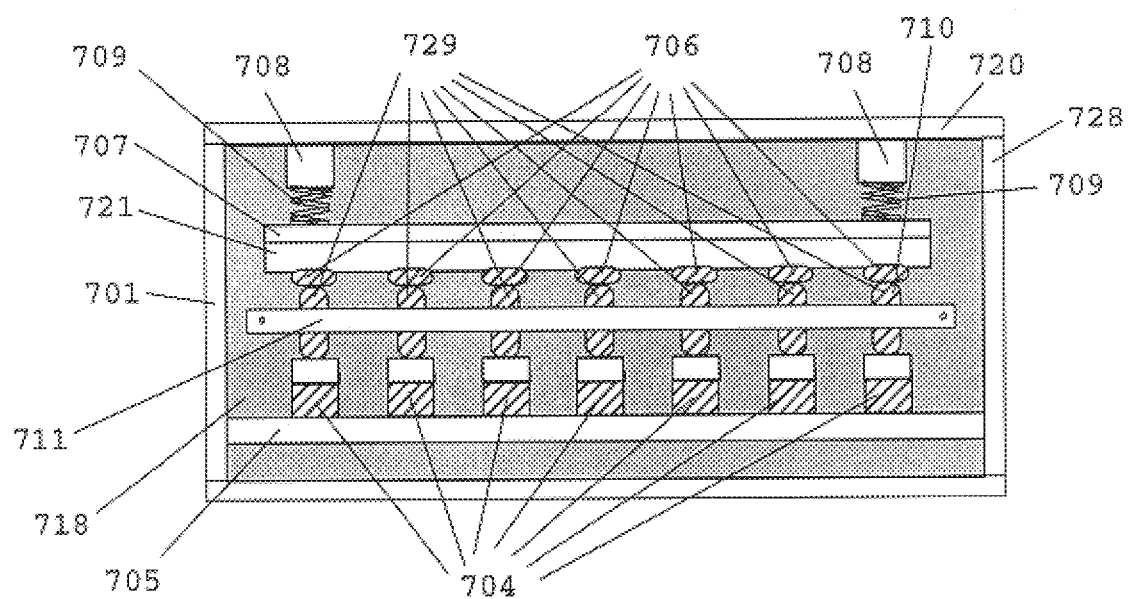
FIG. 16: Switch components for array switch, front view.
Figure 17:
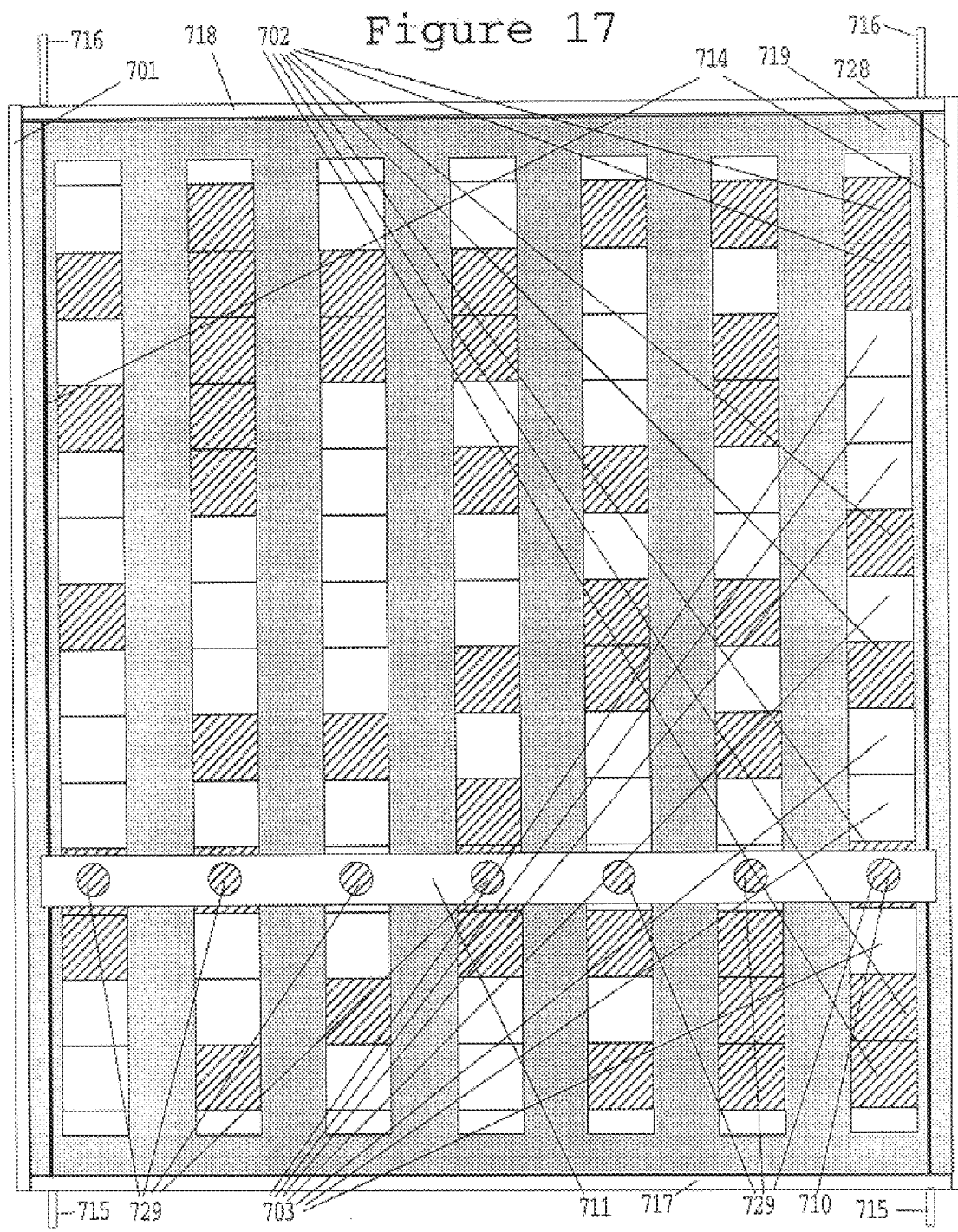
FIG. 17: Switch components for array switch, top view.

FIGS. 15, 16 and 17 illustrate a side view, a front view, and a top view respectively, of major components of an array switch. Referring to FIG. 15, a short section 710 of conducting material such as copper, moves back and forth between a continuous strip of conducting material 706, and a strip comprised of a lower layer 704 of conducting material, and an upper layer of sections of conducting material 702 and sections of non-conducting material 703, such as plastic. Each section such as the sections 702 will be referred to as a strip conducting section, and each section such as the sections 703 will be referred to as a strip non-conducting section. Each pair of strips such as strip 706 and strip 704 with its strip conducting sections and strip non-conducting sections will be referred to as a circuit on-off strip pair. Each circuit on-off strip pair has two points, shown as 712 and 713 for the circuit on-off strip pair seen in the side view of FIG. 15, that are the array circuit point pair for that circuit on-off strip pair. Each short section of conducting material such as 710 will be referred two as a center conducting piece. The components illustrated in FIG. 15 including: a circuit on-off strip pair, a center conducting piece, an array circuit point pair, and any combination of strip conducting sections and strip non-conducting sections, together form what will be termed a strip circuit switch. An array switch has a group of strip circuit switches such as the strip circuit switch illustrated in FIG. 15

The center conducting piece 710 that is seen in the side view of FIG. 15, is seen in the top view of FIG. 17 to be one of a group of center conducting pieces 729, that are all housed in a rectangular housing 711 of non-conducting material. Continuing to refer to FIG. 17, each center conducting piece 729 can move freely up or down within the housing 711. The housing 711 is attached to cables 714, and is moved back and forth by the cables. As the housing 711 moves, the center conducting pieces 729 move over strip conducting sections such as sections 702, and strip non-conduction sections such as sections 703. Referring to FIG. 15, the position of the housing 711 is such that the center conducting piece 710 is centered over a strip conducting section 702. As the housing 711 moves back and forth, whenever a center conducting piece is in contact with a strip conducting section, a circuit is completed between the two points of the array circuit point pair for that center conducting piece. In FIG. 15, points 712 and 713 are the array circuit point pair for the circuit on-off strip pair seen in the side view. Because the center conducting piece is over a strip conducting section 702, the circuit formed is from point 712, through the upper conducting strip 706, through the center conducting piece 710, through the strip conducting section 702, through the lower conducting strip 704, to point 713. Thus, whenever a center conducting piece is over a strip conducting section 702, the strip circuit switch for that center conducting piece is on, and whenever the center conducting piece is not over a strip conducting section 702, the strip circuit switch for that center conducting piece is off. It is important to the reliable operation of an array switch that the design of the array switch be such that for all switch positions each center conducting piece is approximately centered over a strip conducting section or a strip non-conducting section.

Referring to the front view of FIG. 16, the individual bottom conducting strips 704 are attached to a rigid non-conducting board or panel 705 that is attached to the sides 701 and 728 of the array switch housing. The individual upper conducting strips 706 are attached to one side of a section 721 that is non-conducting and that is of a slightly to moderately compressible material such as dense foam rubber. This section 721 in turn is attached to a rigid board or panel 707. The board or panel 707 is in turn attached to springs 709 that are attached to mountings 708, and the mountings 708 are attached to the top 720 of the switch housing. The design and dimensions of the parts are such that at the point of contact of the center conducting pieces 729 each of the upper conducting strips 706 is compressed slightly into the section 721 of slightly to moderately compressible material 721, to ensure a good electrical connection between each center conducting piece 729, the upper conducting strip, and the lower strip conducting sections. Although a total of four springs are illustrated in FIGS. 15–17, an array of springs can be used, such as to ensure each center conducting piece will always make a good electrical connection.

Figure 18:
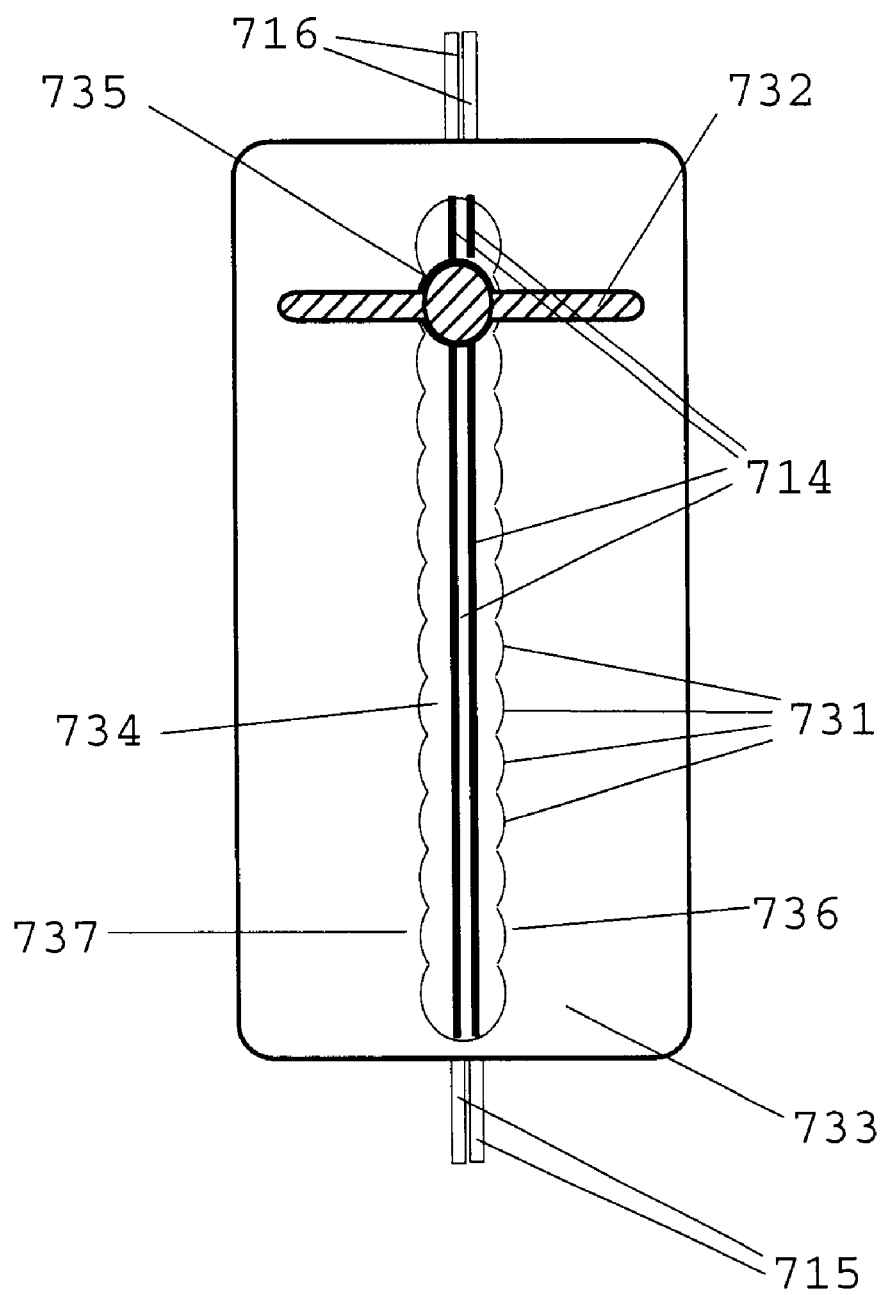
FIG. 18: Driver control means for array switch, top view.

FIG. 17 illustrates two cables 714 connected to the center conducting piece housing 711. Each of these cables runs through one of the cable housings 715 and 716 that are attached to the front 717 and back 718 of the array switch housing respectively. FIG. 18 illustrates a driver control means for the array switch of FIGS. 15–17. The pair of cable housings 715 and 716 are attached to the bottom and top of the driver control means control panel 733. The cables 714 are attached to the bottom of a switch handle 735, so that as the driver grips the switch handle bar 732 and moves the handle up or down as shown in the view of FIG. 18, the center conducting piece housing 711 of FIG. 17 is moved back and forth, and the center conducting pieces move along the strips. Continuing to refer to FIG. 18, the two sides of the open center section 734 of the control panel 733 are shaped as groups of equally sized arcs 731, and the arcs of the two sides are aligned. The handle is of a slightly compressible material, and at the point of contact with the panel, the handle diameter is approximately the same size as the diameter of the circles corresponding to the arcs. The design of the driver control means of FIG. 18 is such that as the handle is operated, it moves in increments of one arc section 31, and whenever it is released the structure of the control means keeps the handle centered between two arc sections. Because the size of the arc sections is equal to the length of the strip conducting sections and strip non-conducting sections, the design of the array switch and the driver control means is such as to keep each center conducting piece approximately centered on a strip conducting section or a strip non-conducting section for each switch position. Thus it can be seen that each strip circuit switch of a array switch has a total number of strip conducting sections and strip non-conducting sections that equal the number of arc sections on each side of the open center section of the driver control means panel, and each pair of aligned arc sections such as pair 736–737 of FIG. 18 corresponds to one switch position for the array switch.

Figure 19:
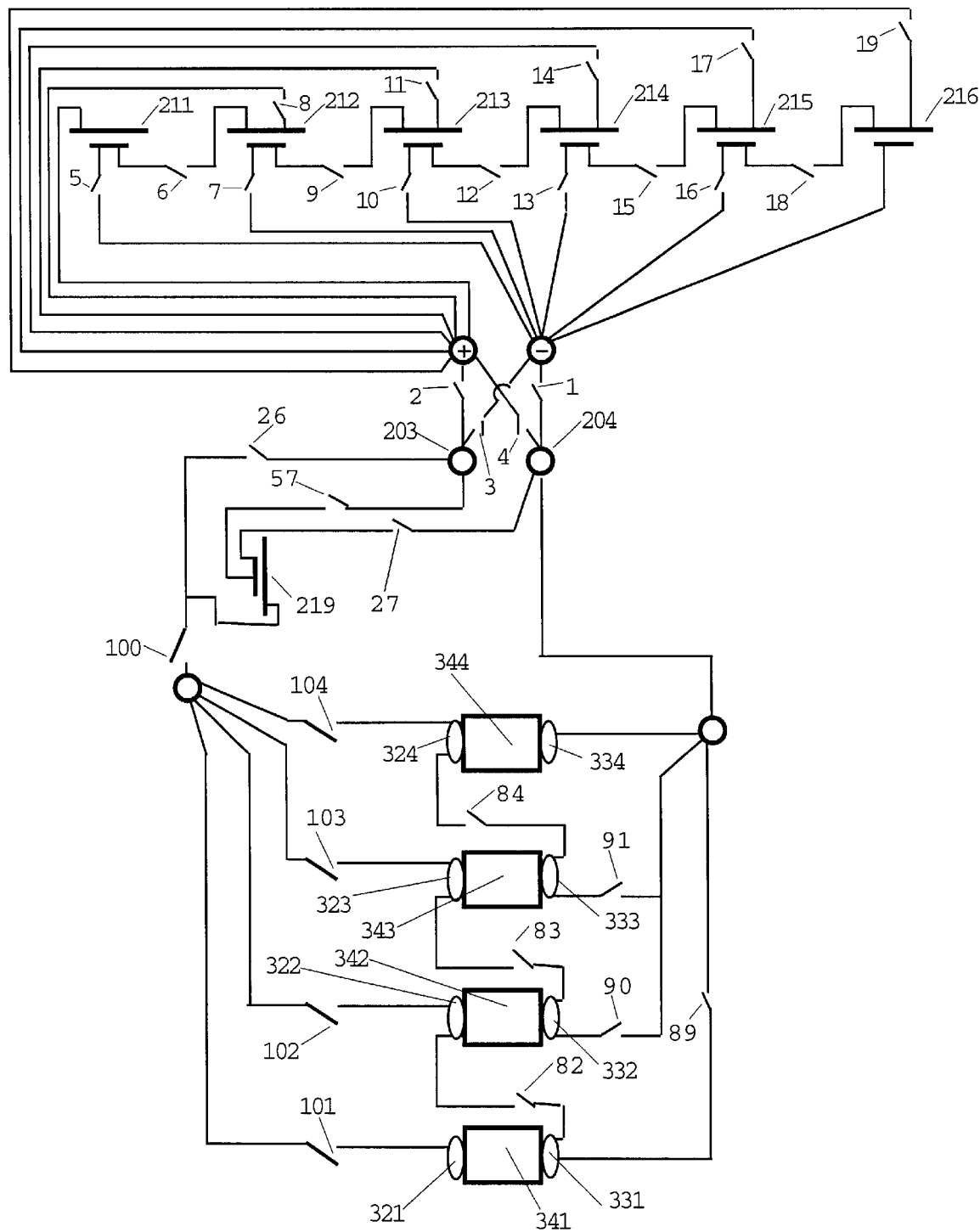
FIG. 19: Circuit Design B

FIG. 19 is a circuit design to illustrate the use of an array switch having switch settings and positions that are charted in FIG. 20. FIG. 20 charts the array switch settings for each of the 32 strip circuit switches controlled by the array switch, shown as rows, and for each of 38 different switch positions of the array switch, shown as columns. For the array of settings of FIG. 20, 1 designates on and 0 designates off. The circuit design of FIG. 19 is intentionally similar to the circuit design of FIGS. 9–13 in many ways. The same numbers are used for the same individual on-off electrical switches in the same positions in the circuit diagrams. However, where in FIGS. 9–13 these switches represent either individually operated driver controlled switches or switches controlled by driver operated multi-switches, all of the individual on-off electrical switches of FIG. 19 except power control switch 100 are controlled by one array switch. Each of the individual on-off electrical switches of FIG. 19 except power control switch 100 represents one strip circuit switch of the array switch. The circuit design of FIG. 19 is different in three additional respects from the circuit design of FIGS. 9–13. First, in FIG. 19 Motor-Generators 341–344 are substituted for the Motor-Generators 301–304 of FIGS. 9–13. When operating as motors at the same voltage, the four Motor-Generators 341–344 of FIG. 19, controlled by strip circuit switches 101–104 are of increasing power, and are related as follows: Motor-Generator 344 is approximately 8 times as powerful as Motor-Generator 341, approximately 4 times as powerful as Motor-Generator 342, and approximately 2 times as powerful as Motor-Generator 343. Thus, all four Motor-Generators operating together as motors are approximately 15 times as powerful as Motor-Generator 341 operating alone as a motor, and different combinations of Motor-Generators operating as motors yield 15 approximately equal increments of total Motor-Generator power output. Because the relative power of Motor-Generators operating as motors is proportionate to the relative generating capacity of Motor-Generators operating as generators, the four Motor-Generators of the circuit design of FIG. 19 can also be operated in different combinations to yield 15 increments of total Motor-Generator generating capacity for a given and equal RPM of all of the Motor-Generators. Second, the 6V turbo battery 218 of FIGS. 9–13 is replaced by a 12V turbo battery 219 in FIG. 19. Third, an additional circuit section has been added in FIG. 19 connecting the negative pole of turbo battery 219 with EMF point 204, and is controlled by a new strip circuit switch 27, that is present in the circuit design of FIG. 19 but absent in the circuit designs of FIGS. 9–13.

Referring to FIG. 20, it can be seen that there are two ranges of fifteen switch positions such that for the range of switch positions all strip circuit switch settings remain unchanged except for the four strip circuit switches 101–104 controlling the operation of the four Motor-Generators 341–344. This is true of positions 18–32 and of positions 2–16. For these ranges of switch positions, the strip circuit switches that remain unchanged establish one EMF potential difference between points 204–203, and the four Motor-Generator strip circuit switches 101–104 are changed in combination to incrementally increase the total operating Motor-Generator motor or generator power when the power control switch 101 is on. The pattern of operating and not operating individual Motor-Generators is as follows. Because Motor-Generator 341 is the least powerful, it's on or off status alternates with each switch position. Motor-Generator 342 is twice as powerful as Motor-Generator 341, and therefore Motor-Generator 342's on or off status alternates every two switch positions, for example on for positions 19–20, off for positions 21–22, then on for positions 23–24, and so forth. Using power factors for Motor-Generators 341–344 of 1, 2, 4 and 8 respectively, it can be seen that moving from switch position 18 to switch position 32, the sum of these power factors increases from 1 to 15 in increments of 1. The pattern of operating and not operating individual Motor-Generators as generators for switch positions moving from position 16 to position 2 is a mirror image of the pattern for operating and not operating individual Motor-Generators as motors moving from switch positions 18 to 32. Thus, using the same power factors as representing generating power, the sum of these power factors increases from 1 to 15 in increments of 1 moving from switch position 16 to switch position 2. From switch position 32 to switch position 38, all four Motor-Generators are on. The total Motor-Generator power being used is increased incrementally from switch positions 32 to 38 by altering the on-off status of individual strip circuit switches to increase the EMF at EMF points 203–204 from 12V to 24V in 2V increments. At switch position 2, all four Motor-Generators are operating as generators, however they are operating in parallel. As the vehicle slows, switch position 1 can be used to change the operation of all Motor-Generators to operation in series. Thus, the voltage from all four Motor-Generators is combined, and the rate of deceleration is maximum for slow vehicle speeds. A conventional brake is still required to bring the vehicle to a complete stop.

To operate a vehicle of the present invention of a design including an array switch such as the circuit design and array switch settings design of FIGS. 19–20, a driver uses the switch handle 732 of a driver control means such as the one of FIG. 17 as a combined throttle and brake. By moving the switch handle toward the higher switch positions above position 17 as illustrated in FIG. 20, the driver provides increasing power to the vehicle. By moving the switch handle toward the lower switch positions below position 17 as illustrated in FIG. 20, the driver provides increasing deceleration to the vehicle.

Multiple circuit electrical switches such as the array switch of FIGS. 19–20 can be used in a wide variety of ways in vehicles of the present invention, including but not limited to the use of multiple individually controlled array switches, and one or more array switches in combination with one or more of: power control switches, multi-switches, reverse circuits, individually operated on-off electrical switches, and microprocessor control devices. As one example, a first array switch can be used with a first power control switch that allows all Motor-Generators to function as motors when the first power control switch is on, and a second array switch can be used with a second power control switch that allows all Motor-Generators to function as generators when the second power control switch is on. Thus, the first array switch sets a power level for driving the vehicle, and the second array switch sets a power level for stopping the vehicle. The two power switches can be wired such that if both are on no Motor-Generator can function as either a motor or as a generator. Multiple circuit electrical switches can also be used in combination with transmission and transmission controller systems such as the transmission gearbox 502 and the transmission gearbox controller 506 of FIG. 3, including combinations to increase braking power as the vehicle slows.

I claim:

1. A vehicle and vehicle system(s), comprising:
   a. two or more motor-generators, each having rotating components, and such that for the same input voltage two or more of the said motor-generators individually produce different power outputs, and
   b. one or more vehicle wheels, and
   c. a mechanical drive train that connects each said motor-generator to one or more vehicle wheels, and
   d. more than one rechargeable battery cell, and
   e. a system of electrical circuits comprising multiple circuit sections, with each said circuit section including one or more electrical on-off switches, and
   f. control means to set the said electrical on-off switches and thereby to control the function and use of the said motor-generators and said rechargeable battery cells, and
   g. for each said motor-generator, one or more combination(s) of the said electrical on-off switch settings, set by control means, that function(s) to connect more than one of the said multiple rechargeable battery cells in series with the said motor-generator and to operate said motor-generator as an electrical motor to drive said vehicle, and
   h. for each said motor-generator, one or more combination(s) of the said electrical on-off switch settings, set by control means, that function(s) to connect said motor-generator either individually to one said rechargeable battery cell or to multiple rechargeable battery cells in parallel, such that for a sufficiently high RPM of the said motor-generator's rotating components said motor-generator operates as a generator and charges said rechargeable battery cell(s).

2. The vehicle and vehicle system(s) of claim 1 further comprising two or more motor-generators such that for the same input voltage one or more of said motor-generators produces or produce a power output that is an approximate integer multiple, or are approximate integer multiples, for any integer greater than one of the power output of the motor-generator having the lowest power output, and such that the set of all total power output combinations from all possible combinations of any or all of the said two or more motor-generators operating as motors approximates a sequential integer range of multiples of the power output of the motor-generator having the lowest power output.

3. The vehicle and vehicle system(s) of claim 1 such that for either some combination(s) or for every possible combination of two or more of the said motor-generators there is at least one combination of the said electrical on-off switch settings, set by control means, that functions both to operate the said combination of motor-generators as motors to drive the vehicle, and to not operate any other motor-generator(s) of the said vehicle and vehicle system(s) as motors to drive the vehicle.

4. The vehicle and vehicle system(s) of claim 1 such that for either some combination(s) or for every possible combination of two or more of the said motor-generators there is at least one combination of the said electrical on-off switch settings, set by control means, that functions both to operate the said combination of motor-generators as generators to charge one or more of the said rechargeable battery cell components(s), and to not operate any other motor-generator of the said vehicle and vehicle systems as a generator to charge any said rechargeable battery cell(s).

5. The vehicle and vehicle system(s) of claim 1 further comprising one or more driver controlled power control switches such that no said motor-generator component can function as a motor or a generator unless one or more of the said driver controlled power control switches is on.

6. The vehicle and vehicle system(s) of claim 1 further comprising two or more driver controlled power control switches such that no said motor-generator can function as a motor to drive the vehicle unless a first said driver controlled power control switch is on.

7. The vehicle and vehicle system(s) of claim 1 further comprising two or more driver controlled power control switches such that no said motor-generator can function as a generator to charge any said rechargeable battery cell unless a second said driver controlled power control switch is on.

8. The vehicle and vehicle system(s) of claim 6 such that when the said first driver controlled power control switch is on, no said motor-generator can function as a generator to charge any said rechargeable battery cell.

9. The vehicle and vehicle system(s) of claim 7 such that when the said second driver controlled power control switch is on, no said motor-generator can function as a motor to drive the vehicle.

10. The vehicle and vehicle system(s) of claim 1 further comprising one or more combination(s) of the said electrical on-off switch settings, set by control means, such that one or more motor-generators can be operated as motors to drive the vehicle backwards.

11. The vehicle and vehicle system(s) of claim 1 further comprising a set of voltage determining combinations of the said electrical on-off switch settings, set by control means, such that for a given combination of one or more motor-generators operating as motors to drive the vehicle forward, individual elements of the said set of voltage determining combinations of circuit sections and electrical on-off switch settings operate the said combination of motor-generators at different voltage levels such that the total electrical power used to drive the vehicle is greater or less as the voltage level is greater or less.

12. The vehicle and vehicle system(s) of claim 1 further comprising a set of voltage determining combinations of the said electrical on-off switch settings, set by control means, such that for a given combination of one or more motor-generators operating as motors to drive the vehicle forward, individual elements of the said set of voltage determining combinations of circuit sections and electrical on-off switch settings operate the said combination of motor-generators at incrementally increasing voltage levels such that the total electrical power used to drive the vehicle is increased incrementally by means of the said incrementally increasing voltage levels.

13. The vehicle and vehicle system(s) of claim 1 further comprising a set of one or more turbo rechargeable battery cells that are not recharged during operation of the vehicle, such that for one or more combination(s) of the said electrical on-off switch settings, set by control means, the said set of turbo rechargeable battery cells is included in circuits that power one or more of the said motor-generators operating as a motor(s) to drive the vehicle.

14. The vehicle and vehicle system(s) of claim 1 further comprising one or more turbo rechargeable batteries, each having multiple individual battery cells internally connected in series, that are not recharged during operation of the vehicle, such that for one or more combination(s) of the said electrical on-off switch settings, set by control means, the said set of turbo rechargeable batteries is included in circuits that power one or more of the said motor-generators operating as a motor(s) to drive the vehicle.

15. The vehicle and vehicle system(s) of claim 1 such that for a rechargeable battery cell of the said vehicle and vehicle system(s) or for a group of rechargeable battery cells of the said vehicle and vehicle system(s) a rechargeable battery comprised of multiple individual battery cells internally connected in series can be substituted as the functional equivalent of the said rechargeable battery cell or the said group of rechargeable battery cells.

16. The vehicle and vehicle system(s) of claim 1 further comprising one or more multiple circuit electrical switches operated by control means, such that each said multiple circuit electrical switch has multiple switch positions, and such that each said multiple circuit electrical switch operates more than one individual electrical circuit, and such that for each said switch position the said multiple circuit electrical switch sets each of the said individual electrical circuits as either on or off.

17. The vehicle and vehicle system(s) of claim 16 where one or more switch positions of one or more of the said multiple circuit electrical switches is set directly by a driver.

18. The vehicle and vehicle system(s) of claim 16 further comprising two of the multiple circuit electrical switches and two driver operated power control switches, such that the first multiple circuit electrical switch and the first power control switch function to control motor-generators operating as motors, and the second multiple circuit electrical switch and the second power control switch function to control motor-generators operating as generators, such that any or all motor-generators can not function as a motor to drive the vehicle unless the first power control switch is on, and such that any or all motor-generators can not function as a generator to generate and store electrical power unless the second power control switch is on.

19. The vehicle and vehicle system(s) of claim 18 such that no motor-generator can function as either a motor or as a generator when both of the power control switches are on.

20. The vehicle and vehicle system(s) of claim 1 further comprising mechanical means for a driver and/or passenger (s) to provide power to the vehicle by means of a pedal driven drive train, such that the function of said pedal driven drive train is independent of the function of any motor-generator to drive the vehicle or to generate and store electrical power.

* * * * *